US012017450B2

(12) United States Patent
Shindo

(10) Patent No.: US 12,017,450 B2
(45) Date of Patent: Jun. 25, 2024

(54) LIQUID EJECTION APPARATUS

(71) Applicant: Brother Kogyo Kabushiki Kaisha, Nagoya (JP)

(72) Inventor: Tatsuya Shindo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 196 days.

(21) Appl. No.: 17/644,823

(22) Filed: Dec. 17, 2021

(65) Prior Publication Data

US 2022/0194076 A1 Jun. 23, 2022

(30) Foreign Application Priority Data

Dec. 22, 2020 (JP) ................................ 2020-212886

(51) Int. Cl.
*B41J 2/045* (2006.01)
*B41J 2/165* (2006.01)
*B41J 29/393* (2006.01)

(52) U.S. Cl.
CPC ......... *B41J 2/0451* (2013.01); *B41J 2/04581* (2013.01); *B41J 2/16517* (2013.01); *B41J 2/16526* (2013.01); *B41J 2/16579* (2013.01); *B41J 2002/1657* (2013.01); *B41J 2002/16573* (2013.01); *B41J 2029/3935* (2013.01)

(58) Field of Classification Search
CPC ...................................................... B41J 2/0451
See application file for complete search history.

(56) References Cited

U.S. PATENT DOCUMENTS 6,454,380 B1 * 9/2002 Endo .................... B41J 2/04551 347/19
2002/0005873 A1 * 1/2002 Suzuki ................. B41J 2/16526 347/35
2007/0040878 A1 2/2007 Ikefuji et al.
2007/0139461 A1 6/2007 Izuo
2009/0058920 A1 * 3/2009 Endo ........................ B41J 2/125 347/19

(Continued)

FOREIGN PATENT DOCUMENTS

JP 2007-054970 A 3/2007
JP 2007-152889 A 6/2007

(Continued)

*Primary Examiner* — Shelby L Fidler
(74) *Attorney, Agent, or Firm* — Scully, Scott, Murphy & Presser, PC

(57) ABSTRACT

A liquid ejection apparatus includes: a liquid ejection head having nozzles; a signal output device; a recovery device configured to perform a first recovery operation or a second recovery operation, to discharge liquid from the nozzles; and a controller configured to: in response to receiving a second signal, activate the signal output device, and drive the liquid ejection head in a check mode for ejecting liquid from the nozzles, the second signal instructing to record a check pattern on a recording medium; in response to receiving a first signal indicating that a first nozzle being one of the nozzles is in failure in liquid ejection when the liquid ejection head in driven in the check mode, activate the recovery device to perform the first recovery operation; and subsequent to the first recovery operation, drive the liquid ejection head to record the check pattern on the recording medium.

20 Claims, 13 Drawing Sheets

(56) References Cited

U.S. PATENT DOCUMENTS

| | | | | |
|---|---|---|---|---|
| 2009/0079773 | A1* | 3/2009 | Hosono | B41J 2/1652 347/11 |
| 2010/0026753 | A1* | 2/2010 | Kuroda | B41J 2/16532 347/23 |
| 2013/0141484 | A1* | 6/2013 | Kasai | B41J 2/0451 347/14 |
| 2014/0300657 | A1 | 10/2014 | Ike | |

FOREIGN PATENT DOCUMENTS

| | | | |
|---|---|---|---|
| JP | 2012-147126 | A | 8/2012 |
| JP | 2014-200982 | A | 10/2014 |

* cited by examiner

FIG. 9A

| | TIME INTERVALS |
|---|---|
| FIRST FLUSHING MANNER | ΔT1 |
| SECOND FLUSHING MANNER | ΔT2 (>ΔT1) |

FIG. 9B

| | NUMBER OF INK TO BE DISCHARGED |
|---|---|
| NOZZLE FOR COLOR INK | K1 |
| NOZZLE FOR BLAK INK | K2 (>K1) |

FIG. 13

| | POTENTIAL |
|---|---|
| FIRST FLUSHING MANNER | V1 |
| SECOND FLUSHING MANNER | V2(>V1) |

LIQUID EJECTION APPARATUS

CROSS-REFERENCE TO RELATED APPLICATION

This application claims priority from Japanese Patent Application No. 2020-212886 filed on Dec. 22, 2020, the content of which is incorporated herein by reference in its entirety.

TECHNICAL FIELD

Aspects of the disclosure relate to a liquid ejection apparatus that ejects liquid from nozzles.

BACKGROUND

An example of a liquid ejection apparatus that ejects liquid from nozzles includes a printer that ejects ink from nozzles of a recording head. For example, a known printer determines whether, with respect to each of the nozzles, a target nozzle is in failure in ink ejection (hereinafter, a nozzle that is in failure is referred to as a failure nozzle), as described below. The known printer records a check pattern on a sheet by a recording head, and reads the check pattern by a scanner. Based on a result of reading the check pattern, a controller of the printer determines whether, with respect to each of the nozzles, a target nozzle is a failure nozzle. If the controller determines that one or more nozzles are failure nozzles, the controller activates a cleaning unit to perform cleaning on the one or more failure nozzles.

SUMMARY

In such a known printer, cleaning may be performed by the cleaning unit in a cleaning manner suitable for the number of failure nozzles.

Nevertheless, in some cases, the failure nozzles may include not only a nozzle that needs cleaning by the cleaning unit for recovering its ejection performance but also a nozzle that does not need cleaning by the cleaning unit and whose ejection performance may be recovered by flushing in which the recording head is driven to flush the failure nozzles with ink. If cleaning is performed by the cleaning unit in a manner suitable for the number of failure nozzles including one or more nozzles whose ejection performance may be recovered by flushing, ink may be consumed excessively by the cleaning.

Aspects of the disclosure provide a liquid ejection apparatus that may save liquid consumption in a recovery operation for recovering ejection performance of one or more nozzles in failure in liquid ejection.

In one or more aspects of the disclosure, a liquid ejection apparatus includes a liquid ejection head, a signal output device, a recovery device, and a controller. The liquid ejection head may have nozzles. The liquid ejection head may be configured to be driven in a check mode. The signal output device may be configured to, when the liquid ejection head is driven in the check mode, output a first signal indicating that a first nozzle is in failure in liquid ejection. The first nozzle may be one of the nozzles. The recovery device may be configured to perform a first recovery operation or a second recovery operation, to discharge liquid from the nozzles. The controller may be configured to, in response to receiving a second signal, activate the signal output device, and drive the liquid ejection head in the check mode for ejecting liquid from the nozzles. The second signal may instruct to record a check pattern on a recording medium. The controller may be further configured to, in response to receiving the first signal, activate the recovery device to perform the first recovery operation, and subsequent to the first recovery operation, drive the liquid ejection head to record the check pattern on the recording medium.

In response to receiving a second signal, the controller may drive the liquid ejection head in the check mode. In response to receiving a first signal, the controller may activate the recovery device to perform the first recovery operation. Subsequent to the first recovery operation, the controller may drive the liquid ejection head to record a check pattern on a recording medium. That is, the recording of the check pattern may be performed after ejection performance of one or more first nozzles that are recoverable by the first recovery operation is recovered. Therefore, in a case where the ejection performance of all of the one or more first nozzles has been recovered by the first recovery operation, an additional recovery operation based on the recording result of the check pattern might not need to be performed. On the other hand, in a case where the ejection performance of some of the one or more first nozzles has not been recovered, a recovery manner in a less amount of liquid to be discharged may be adopted in the recovery operation to be performed based on the recording result of the check pattern. Thus, according to the one or more aspects of the disclosure, the liquid consumption in the recovery operation for recovering the ejection performance of the one or more first nozzles that are in failure in liquid ejection may be saved.

BRIEF DESCRIPTION OF THE DRAWINGS

FIG. 9A is a table showing time intervals between timings for driving the inkjet head in each of flushing in a first flushing manner and flushing in a second flushing manner.

FIG. 9B is a table showing the number of times ink to be discharged from a color nozzle and the number of times ink to be discharged from a black nozzle in flushing in the second flushing manner.

FIG. 13 is a table showing magnitude of potential to be applied to individual electrodes in each of flushing in the first flushing manner and flushing in the second flushing manner according to a third modification.

DETAILED DESCRIPTION

Hereinafter, an illustrative embodiment will be described with reference to the accompanying drawings.

General Configuration of Printer

Figure 1:
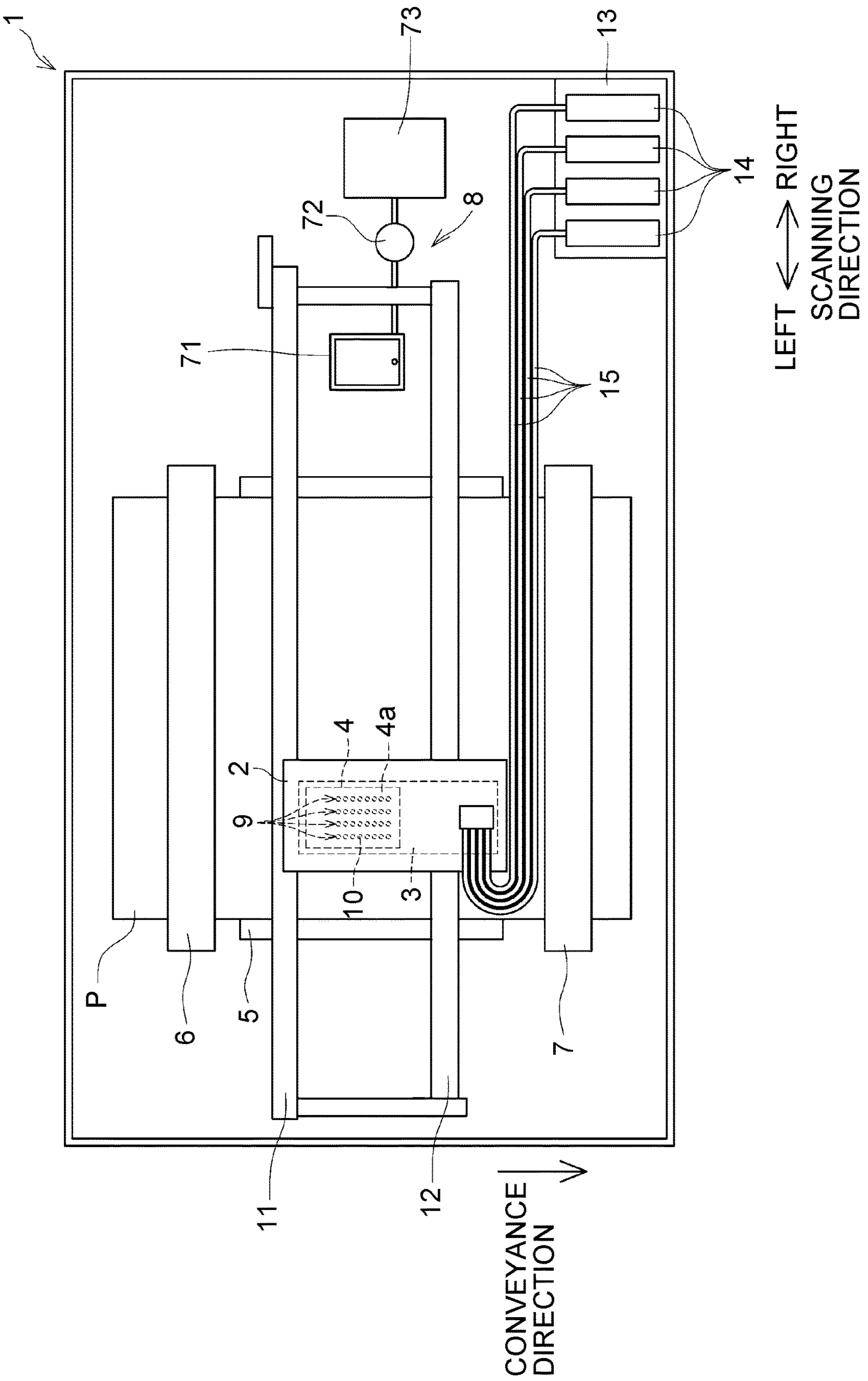
FIG. 1 is a schematic view illustrating a mechanical configuration of a printer.

As illustrated in FIG. 1, a printer 1 includes a carriage 2, a subtank 3, an inkjet head 4, a platen 5, a conveyance roller 6, a conveyance roller 7, and a maintenance unit 8. The printer 1 is an example of a liquid ejection apparatus. The inkjet head 4 is an example of a liquid ejection head.

The carriage 2 is supported by a guide rail 11 and a guide rail 12 each extending in a scanning direction. The carriage 2 is connected to a carriage motor 86 (refer to FIG. 6) via a belt. The carriage 2 is configured to, in response to the carriage motor 86 being driven, move in the scanning direction along the guide rails 11, 12. The scanning direction corresponds to a right-left direction as defined in FIG. 1.

The subtank 3 is mounted on the carriage 2. The printer 1 further includes a cartridge holder 13. The cartridge holder 13 is configured to accommodate four ink cartridges 14 that are attachable thereto and detachable therefrom. In the cartridge holder 13, the ink cartridges 14 are arranged next to each other in the scanning direction. The ink cartridges 14 store respective colored ink. Ink is an example of liquid. More specifically, the ink cartridges 14 store black ink, yellow ink, cyan ink, and magenta ink, respectively, in this order from the rightmost ink cartridge 14 in the scanning direction. The subtank 3 is connected, by respective corresponding tubes 15, to the ink cartridges 14 attached to the cartridge holder 13. Such a configuration may thus enable supply of ink of four colors to the subtank 3 from the respective ink cartridges 14.

The inkjet head 4 is mounted on the carriage 2 and is connected to a lower end portion of the subtank 3. The inkjet head 4 is supplied with ink of four colors from the subtank 3. The inkjet head 4 has a nozzle surface 4*a*. The nozzle surface 4*a* may be a lower surface of the inkjet head 4. The nozzle surface 4*a* has four nozzle rows 9 arranged next to each other in the scanning direction. The nozzle rows 9 include nozzles 10. More specifically, the nozzles 10 are arranged in rows extending in a conveyance direction orthogonal to the scanning direction to form the nozzle rows 9. The inkjet head 4 is configured to eject ink from the nozzles 10. In the inkjet head 4, black ink is ejected from the nozzles 10 belonging to the rightmost nozzle row 9 in the scanning direction. Yellow ink is ejected from the nozzles 10 belonging to the nozzle row 9 to the left of the black nozzle row 9. Cyan ink is ejected from the nozzles 10 belonging to the nozzle row 9 to the left of the yellow nozzle row 9. Magenta ink is ejected from the nozzles 10 belonging to the nozzle row 9 to the left of the cyan nozzle row 9.

Composition of ink differs by color. Due to such difference, generally, black ink is more likely to thicken than color inks (e.g., yellow ink, cyan ink, and magenta ink). A nozzle from which color ink is to be ejected is an example of a second nozzle. A nozzle from which black ink is to be ejected is an example of a third nozzle.

The platen 5 is disposed below the inkjet head 4 and faces the nozzles 10. The platen 5 extends in the scanning direction and has a dimension corresponding to the entire width of a sheet P to be conveyed. The platen 5 is configured to support from below a sheet P being conveyed. The sheet P is an example of a recording medium. The conveyance roller 6 is disposed upstream from the inkjet head 4 and the platen 5 in the conveyance direction. The conveyance roller 7 is disposed downstream from the inkjet head 4 and the platen 5 in the conveyance direction. The conveyance rollers 6, 7 are connected to a conveyance motor 87 (refer to FIG. 6) via gears. The conveyance rollers 6, 7 are configured to, in response to the conveyance motor 87 being driven, rotate to convey a sheet P in the conveying direction.

The maintenance unit 8 includes a cap 71, a suction pump 72, and a waste liquid tank 73. The cap 71 is disposed to the right of the platen 5 in the scanning direction. When the carriage 2 is located at a maintenance position, the nozzles 10 face the cap 71. The maintenance position is further to the right than the platen 5 in the scanning direction.

Figure 6:
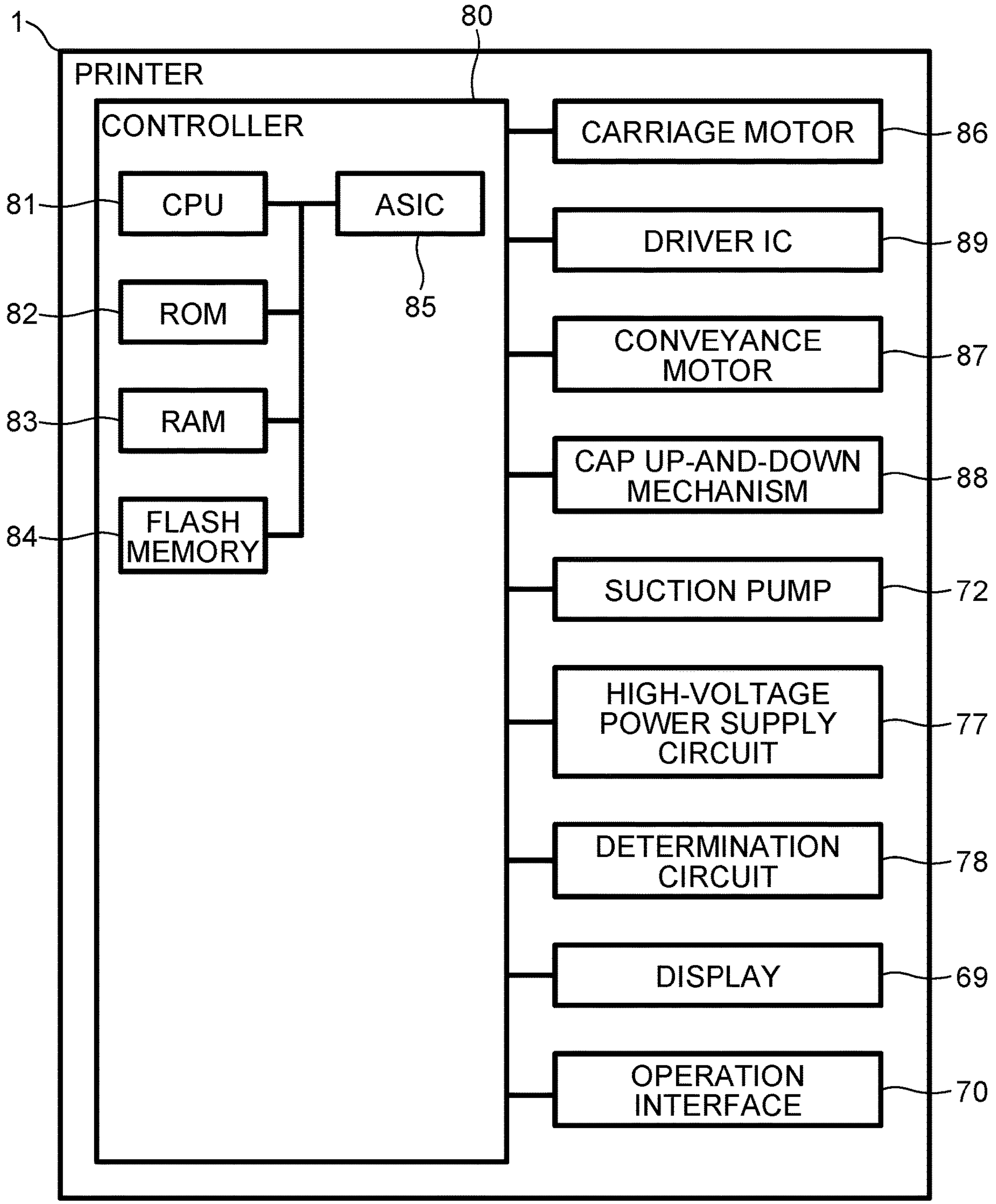
FIG. 6 is a block diagram illustrating an electrical configuration of the printer of FIG. 1.

The cap 71 is movable upward and downward selectively by control of a cap up-and-down mechanism 88 (refer to FIG. 6). The cap up-and-down mechanism 88 may have a similar configuration to a known cap up-and-down mechanism. The description of the cap up-and-down mechanism in JP2012-206396A is incorporated herein by reference. In a state where the nozzles 10 and the cap 71 face each other when the carriage 2 is located at the maintenance position, the cap up-and-down mechanism 88 moves the cap 71 upward. As the cap 71 moves upward, an upper end portion of the cap 71 intimately contacts the nozzle surface 4*a* of the inkjet head 4 to cover the nozzles 10. The cap 71 may not be limited to have such a configuration to intimately contact the nozzle surface 4*a* to cover the nozzles 10. Alternatively, the cap 71 may intimately contact a frame surrounding the nozzle surface 4*a* of the inkjet head 4 to cover the nozzles 10.

The suction pump 72 may be a peristaltic pump. In this case, the suction pump 72 is connected to both the cap 71 and the waste liquid tank 73. With this configuration, the maintenance unit 8 may perform a suction purge. In a suction purge, in response to the suction pump 72 being driven in a state where the cap 71 covers the nozzles 10, ink is sucked from the nozzles 10 of the inkjet head 4 by the suction pump 72. The suction purge is an example of a second recovery operation. Ink discharged from the inkjet head 4 by the suction purge is stored in the waste liquid tank 73.

In the illustrative embodiment, the maintenance unit 8 may perform a suction purge in appropriate one of various suction purge manners. In the various purge manners, ink is discharged by respective amounts. This is because among the various suction purge manners, a driving duration of the suction pump 72, a driving speed of the suction pump 72, or both are different.

For the sake of convenience, in the illustrative embodiment, the cap 71 covers all the nozzles 10 of the inkjet head 4 and ink is discharged from the inkjet head 4 through each nozzle 10 in a suction purge. Nevertheless, in other embodiments, the cap 71 may include a first capping portion and a second capping portion, each of which may cover corresponding nozzles 10 of the inkjet head 4. The first capping portion may cover the nozzles 10 belonging to the rightmost nozzle row 9 from which black ink is ejected, and the second capping portion may cover the nozzles 10 belonging to the remaining nozzle rows 9 from which respective color inks (e.g., yellow, cyan, and magenta inks) are ejected. In this case, the cap up-and-down mechanism 88 may include a switching valve. In a suction purge, the cap up-and-down mechanism 88 may move the first capping portion and the second capping portion simultaneously to cover the respective corresponding nozzles 10. A destination with which the suction pump 72 is communicated may be switched between the first capping portion and the second capping portion by the switching valve. Such a configuration may enable the suction pump 72 to communicate with the first capping portion or the second capping portion of the cap 71 as appropriate, thereby discharging black ink and color inks selectively from the inkjet head 4. Alternatively, the maintenance unit 8 may include a cap 71 and a cap up-and-down mechanism 88 for each nozzle row 9. Such a configuration may enable ink to be discharged from the nozzles 10 of the inkjet head 4 on a nozzle row 9 basis.

Figure 2:
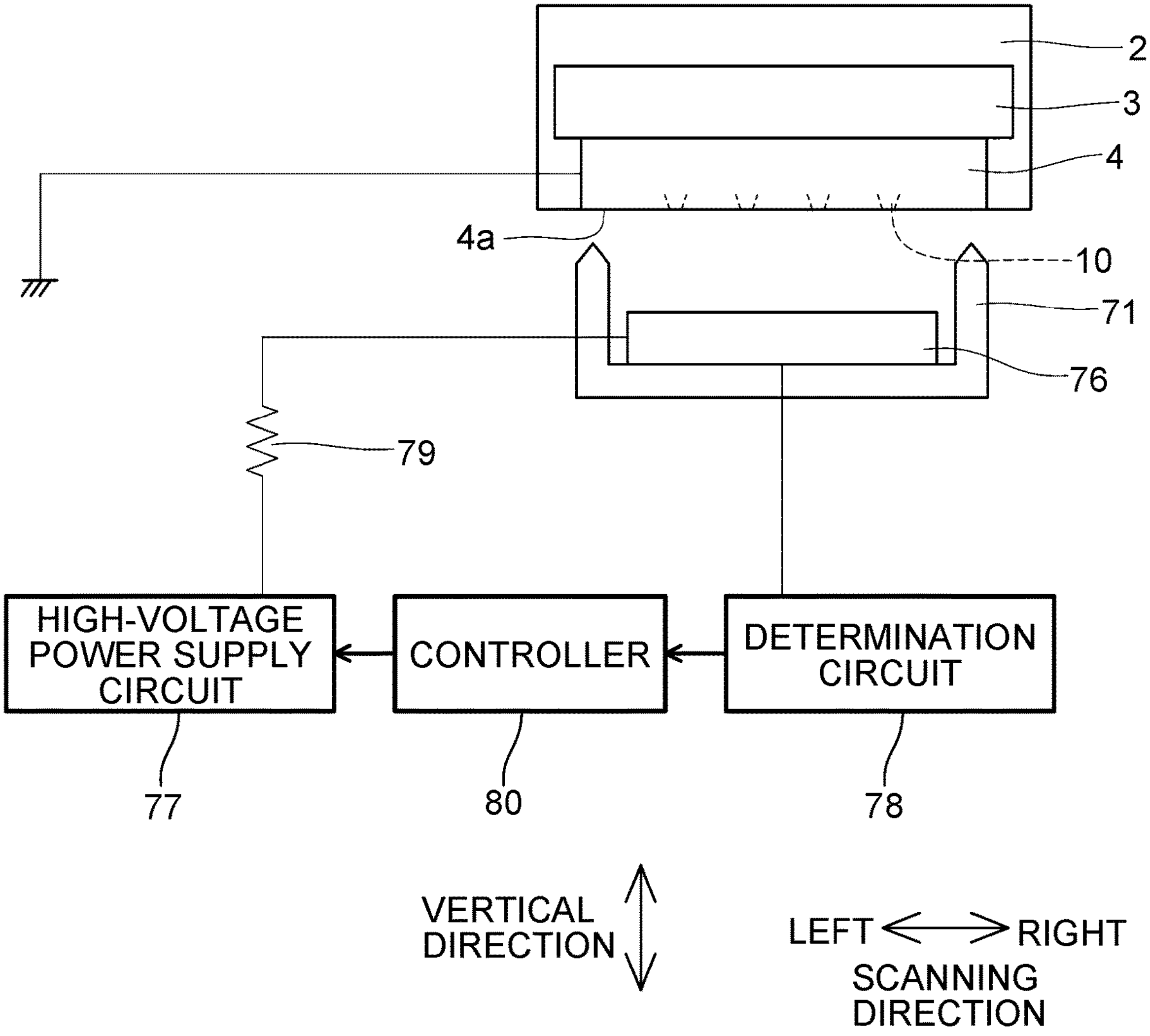
FIG. 2 illustrates a detection electrode disposed in a cap, a connection relationship between the detection electrode and a high-voltage power supply circuit, and a connection relationship between the detection electrode and a determination circuit.

As illustrated in FIG. 2, a detection electrode 76 is disposed in the cap 71. The detection electrode 76 has a flat rectangular shape. The detection electrode 76 is connected to a high-voltage power supply circuit 77 via a resistor 79. In ejection determination, the high-voltage power supply circuit 77 applies a certain positive potential (e.g., approximately 600 V) to the detection electrode 76. The inkjet head 4 is maintained at a ground potential. Thus, a certain potential difference is caused between the inkjet head 4 and the detection electrode 76. A determination circuit 78 is connected to the detection electrode 76. The determination circuit 78 compares a potential indicated by a signal received from the detection electrode 76 with a threshold potential Vt, and outputs a determination signal responsive to the comparison result. The determination signal is an example of a first signal.

The threshold potential Vt is specified within a range between a potential Va and a potential Vb. Each of the potentials Va and Vb is indicated by a potential signal output from the detection electrode 76. The potential Va corresponds to a potential at the detection electrode 76 when the inkjet head 4 is not driven. The potential Vb corresponds to a peak potential at which the potential at the detection electrode 76 reaches when ink is normally ejected in a driving period Td during which the inkjet head 4 is driven (hereinafter, referred to as the driving period Td of the inkjet head 4). In the illustrative embodiment, a combination of the detection electrode 76, the high-voltage power supply circuit 77, the resistor 79, and the determination circuit 78 is an example of a signal output device. The signal output device is configured to output a determination signal (e.g., the first signal) indicating whether a target nozzle 10 is in failure in ink ejection. Hereinafter, a nozzle that is in failure in ink ejection may be simply referred to as a failure nozzle, which is an example of a first nozzle.

Figure 3A:
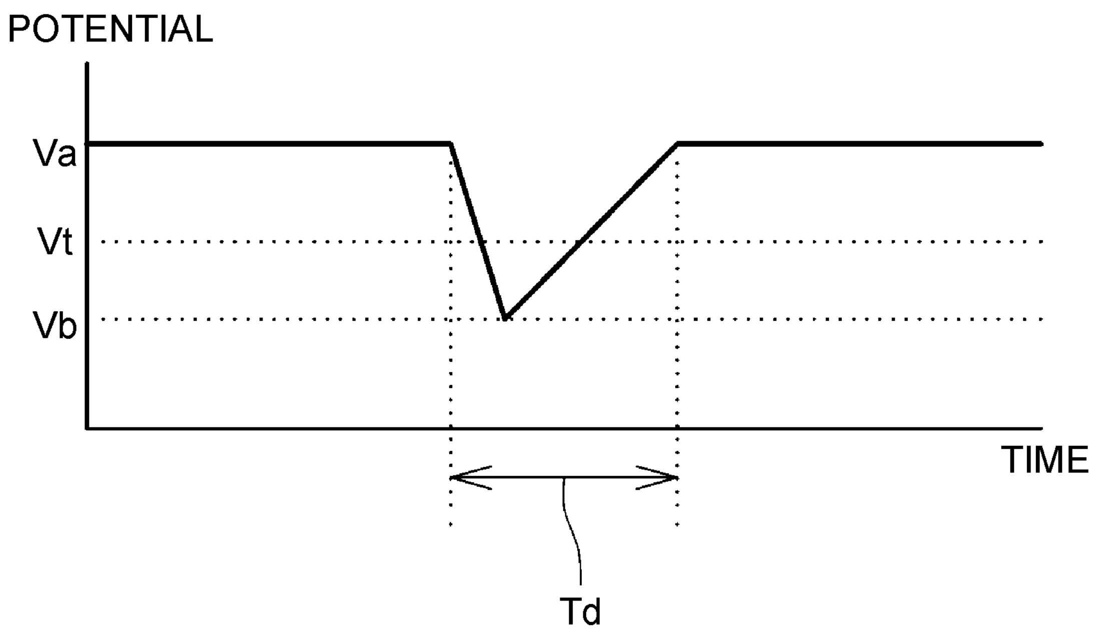
FIG. 3A is a chart showing changes in potential at the detection electrode in a case where ink has been normally ejected from a target nozzle.

More specifically, in ejection determination, a certain potential difference is caused between the inkjet head 4 and the detection electrode 76. Thus, when the inkjet head 4 ejects ink from a target nozzle 10, the ejected ink gets electrically charged. In a state where the carriage 2 is positioned at the maintenance position, the inkjet head 4 is driven in a check mode for ejecting ink from each nozzle 10. In response to this, in a case where ink is normally ejected from a particular target nozzle 10 toward the detection electrode 76, as shown in FIG. 3A, as the charged ink approaches the detection electrode 76, the potential at the detection electrode 76 decreases from the potential Va until the charged ink reaches the detection electrode 76. When the ink reaches the detection electrode 76, the potential at the detection electrode 76 reaches the potential Vb that is lower than the threshold potential Vt. After the charged ink reaches the detection electrode 76, the potential at the detection electrode 76 gradually increases to the potential Va from the potential Vb. That is, the potential at the detection electrode 76 changes in the driving period Td of the inkjet head 4. In a case where the potential at the detection electrode 76 exceeds the threshold potential Vt in the driving period Td, it is determined that ink has been normally ejected from the target nozzle 10 and thus that the target nozzle 10 is not a failure nozzle.

Figure 3B:
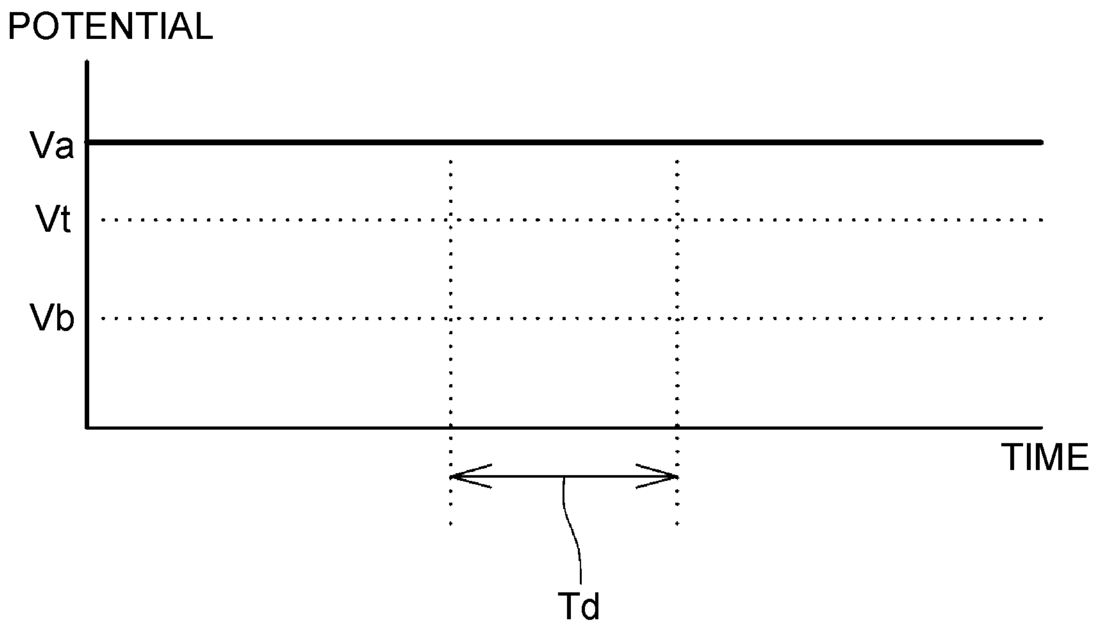
FIG. 3B is a chart showing changes in potential at the detection electrode in a case where ink has not been normally ejected from a target nozzle.

In a case where ink is not ejected from the particular target nozzle 10 although the inkjet head 4 is driven in the check mode, no ink is between the inkjet head 4 and the detection electrode 76. Thus, as shown in FIG. 3B, the potential at the detection electrode 76 is maintained almost constant at the potential Va in the driving period Td of the inkjet head 4. That is, the potential at the detection electrode 76 does not exceed the threshold potential Vt in the driving period Td of the inkjet head 4. In this case, it is determined that ink has not been normally ejected from the target nozzle 10 and thus that the target nozzle 10 is a failure nozzle.

In some cases, in the driving period Td of the inkjet head 4, after the potential at the detection electrode 76 decreases from the potential Va by ink ejection from the target nozzle 10 by driving of the inkjet head 4 in the check mode, the potential at the detection electrode 76 may return to the potential Va without exceeding the threshold potential Vt. In this case, it is also determined that ink has not been normally ejected from the target nozzle 10 and thus that the target nozzle 10 is a failure nozzle.

In the illustrative embodiment, a positive potential is applied to the detection electrode 76 by the high-voltage power supply circuit 77. Nevertheless, in other embodiments, a negative potential (e.g., approximately −600 V) may be applied to the detection electrode 76 by the high-voltage power supply circuit 77. In such a case, in a state where the carriage 2 is positioned at the maintenance position, the inkjet head 4 may be driven in the check mode. In response to this, in a case where ink is normally ejected from a particular target nozzle 10 toward the detection electrode 76, as the charged ink approaches the detection electrode 76, the potential at the detection electrode 76 may increase from the potential Va by exceeding a threshold potential Vt until the charged ink reaches the detection electrode 76. When the charged ink reaches the detection electrode 76, the potential at the detection electrode 76 reaches a particular peak potential. After the charged ink reaches the detection electrode 76, the potential at the detection electrode 76 may gradually decrease to the potential Va from the particular peak potential.

Inkjet Head

Figure 4:
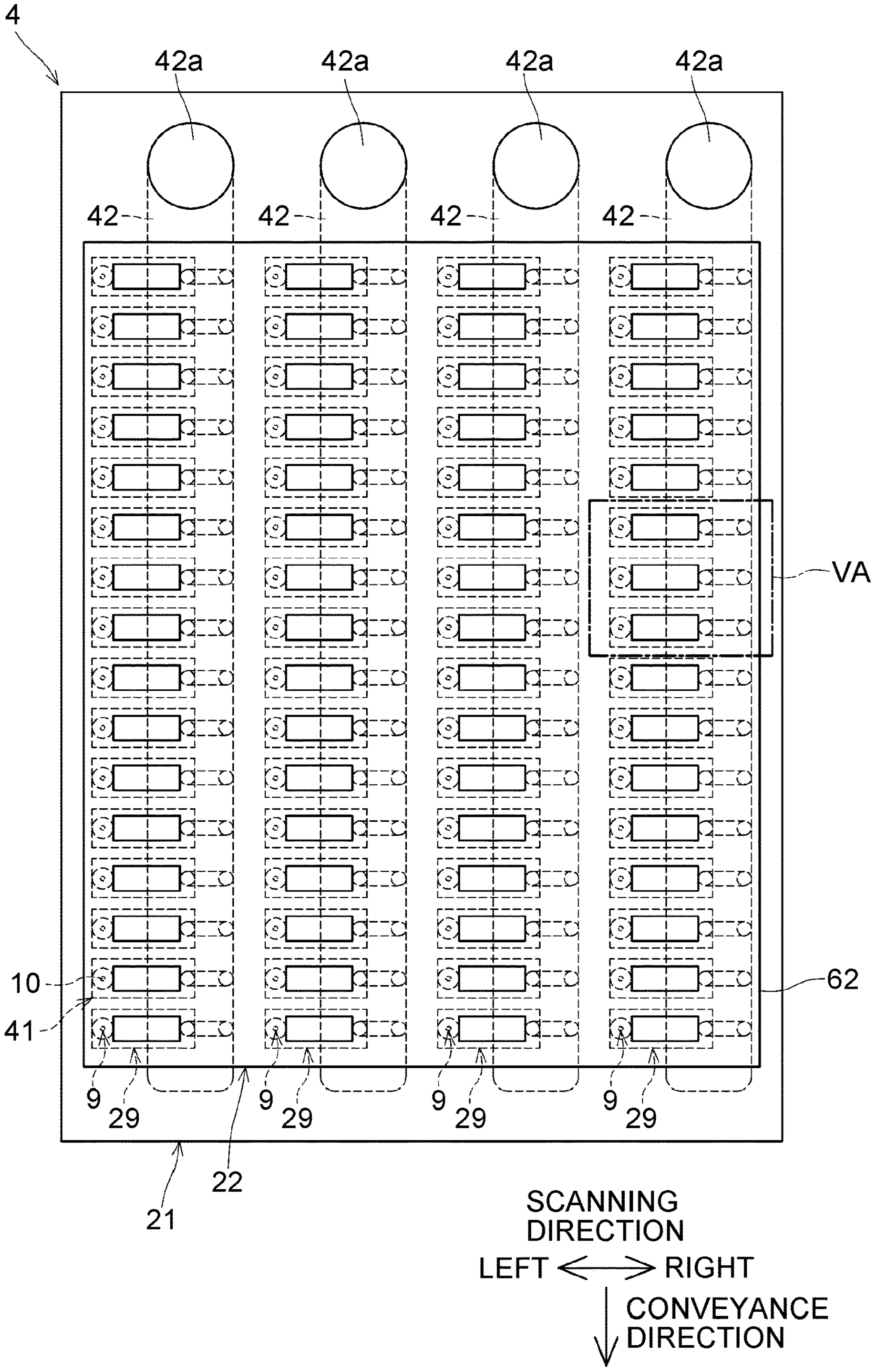
FIG. 4 is a plan view of an inkjet head.
Figure 5A:
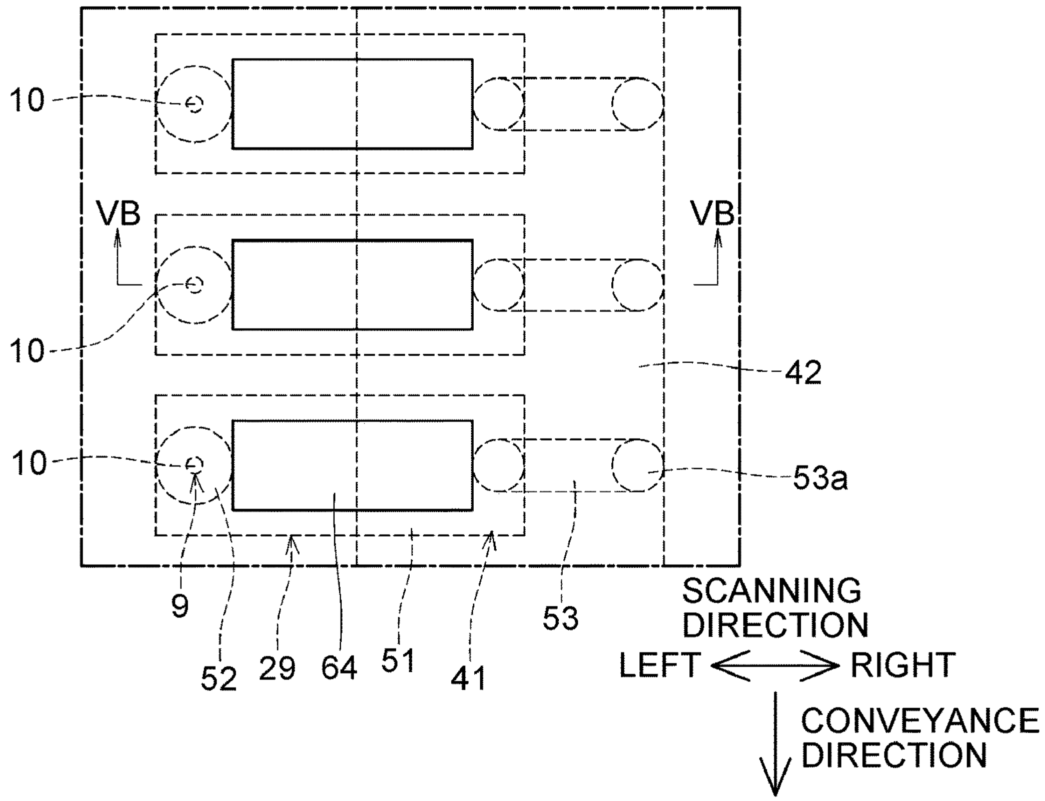
FIG. 5A is an enlarged view of a portion VA in FIG. 4.
Figure 5B:
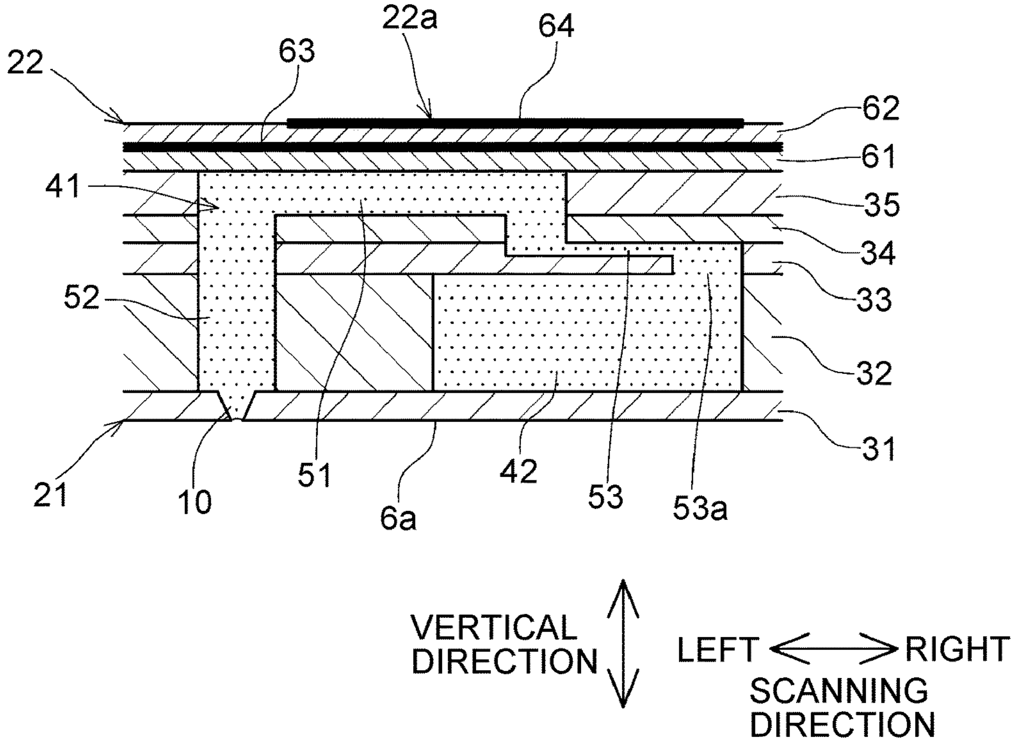
FIG. 5B is a cross-sectional view taken along line VB-VB of FIG. 5A.

Next, a configuration of the inkjet head 4 will be described in detail. As illustrated in FIGS. 4, 5A, and 5B, the inkjet head 4 includes a channel unit 21 and a piezoelectric actuator 22.

The channel unit 21 includes plates 31, 32, 33, 34, and 35. The plate 31 may be a bottom plate of the channel unit 21. The plate 32 is disposed above the plate 31. The plate 33 is disposed above the plate 32. The plate 34 is disposed above the plate 33. The plate 35 is disposed above the plate 34. The channel unit 21 includes individual channels 41 and four common channels 42.

The individual channels 41 are arranged in rows in the conveyance direction so as to form four individual channel rows 29 for the four nozzle rows 9. That is, the channel unit 21 includes the individual channel rows 21 arranged next to each other in the scanning direction.

Each individual channel 41 includes a nozzle 10, a pressure chamber 51, a descender 52, and a restrictor channel 53. In each individual channel 41, a nozzle 10 and a left end portion of a pressure chamber 51 in the scanning direction are connected to each other via a descender 52 such that the nozzle 10 and the pressure chamber 51 are in communication with each other. A restrictor channel 53 is connected to a right end portion of the pressure chamber 51 in the scanning direction such that the restrictor channel 53 and the pressure chamber 51 are in communication with each other. Configurations of the nozzle 10, the pressure chamber 51, the descender 52, and the restrictor channel 53 and positional relationships therebetween are known by a person ordinary skilled in the art. Therefore, a detailed description thereof will be omitted.

The four common channels 42 are disposed at respective positions corresponding to the four individual channel rows 29. Each common channel 42 extends in the conveyance direction and overlaps, in the vertical direction, right end portions of corresponding individual channels 41 belonging to the corresponding individual channel rows 29. Each common channel 42 is connected to right end portions of corresponding restrictor channels 53 so that the common channel 42 and the corresponding restrictor channels 53 are in communication with each other. The restrictor channels 53 constitute the corresponding individual channels 41. Each common channel 42 is configured to receive ink supplied thereto via an inlet 42*a* defined at an upstream end portion of the channel unit 21 in the conveyance direction.

The piezoelectric actuator 22 includes a diaphragm 61, a piezoelectric layer 62, a common electrode 63, and individual electrodes 64. The diaphragm 61 may be made of a piezoelectric material containing lead zirconate titanate, a main component of which is a mixed crystal of lead titanate and lead zirconate. The diaphragm 61 is disposed on an upper surface of the plate 35 that may be one of the plates 31 to 35 constituting the channel unit 21, and covers the pressure chambers 51. The piezoelectric layer 62 is made of the same piezoelectric material used for the diaphragm 61. The piezoelectric layer 62 is disposed on an upper surface of the diaphragm 61 and continuously extends over the pressure chambers 51. In the illustrative embodiment, the diaphragm 61 and the piezoelectric layer 62 are both made of a piezoelectric material. Nevertheless, in other embodiments, the diaphragm 61 may be made of an insulating material, such as a synthetic resin material, other than the piezoelectric material.

The common electrode 63 is disposed between the diaphragm 61 and the piezoelectric layer 62 and extends therebetween in an entire range within which the common electrode 63 and the diaphragm 61 extend. The common electrode 63 is connected to a power supply via a wiring and is maintained at a ground potential. The individual electrodes 64 are disposed on an upper surface of the piezoelectric layer 62. The individual electrodes 64 are in a one-to-one relationship with the pressure chambers 51. Each individual electrode 64 overlaps a central portion of a corresponding pressure chamber 51 in the vertical direction. Each individual electrode 64 is connected to a driver IC 89 (refer to FIG. 6) via a wiring. The ground potential or a drive potential (e.g., approximately 20 V to 30 V) is selectively applied to each individual electrode 64 from the driver IC 89. A portion of the piezoelectric layer 62 sandwiched between a particular portion of the common electrode 63 and an individual electrode 64 is polarized in a thickness direction of the piezoelectric layer 62. Such polarized portions are provided corresponding to the arrangement of the common electrode 63 and the individual electrodes 64.

The piezoelectric actuator 22 has particular portions that serve as drive elements 22*a* for applying pressure to ink in the respective pressure chambers 51. Each drive element 22*a* includes a portion of the diaphragm 61, a portion of the piezoelectric layer 62, a portion of the common electrode 63, and an individual electrode 64. The portions of the diaphragm 61, the piezoelectric layer 62, and the common electrode 63, and the individual electrode 64 overlap a pressure chamber 51 in the vertical direction. In response to the driver IC 89 switching the potential at a target individual electrode 64 between the ground potential and the drive potential, the potential difference occurring between the target individual electrode 64 and the common electrode 63 is changed. This change causes deformation in the piezoelectric layer 62 and the diaphragm 61. Thus, the pressure chamber 51 changes in its shape and thus the pressure applied to ink in the pressure chamber 51 changes, whereby ink is ejected from the nozzle 10 being in communication with the pressure chamber 51.

Electrical Configuration of Printer

Hereinafter, a description will be provided on an electrical configuration of the printer 1. As illustrated FIG. 6, the printer 1 includes a controller 80. The controller 80 includes a CPU 81, a ROM 82, a RAM 83, a flash memory 84, and an ASIC 85. The controller 80 is configured to control operations of the carriage motor 86, the inkjet head 4, the conveyance motor 87, the cap up-and-down mechanism 88, the suction pump 72, the high-voltage power supply circuit 77, and the driver IC 89. In the illustrative embodiment, the controller 80 is configured to control the driver IC 89 to control driving of the inkjet head 4. The controller 80 is configured to receive a determination signal from the determination circuit 78.

The printer 1 further includes a display 69 and an operation interface 70. The operation interface 70 is an example of an inputting device. The display 69 may be a liquid crystal display disposed at a housing of the printer 1. The controller 80 is configured to control the display 69 to display information necessary for operating the printer 1. The operation interface 70 includes buttons disposed at the housing of the printer 1 and a touch screen of the display 69. In response to a user operating the operation interface 70, a particular signal is input to the controller 80 from the operation interface 70.

In the controller 80, only one of the CPU 81 or the ASIC 85 may perform all processing or a combination of the CPU 81 and the ASIC 85 may perform all processing. Alternatively, the controller 80 may include a single CPU 81 that may perform all processing or include a plurality of CPUs 81 that may share all processing. Alternatively, the controller 80 may include a single ASIC 85 that may perform all processing or include a plurality of ASICs 85 that may share all processing.

Processing in Image Recording

Figure 7:
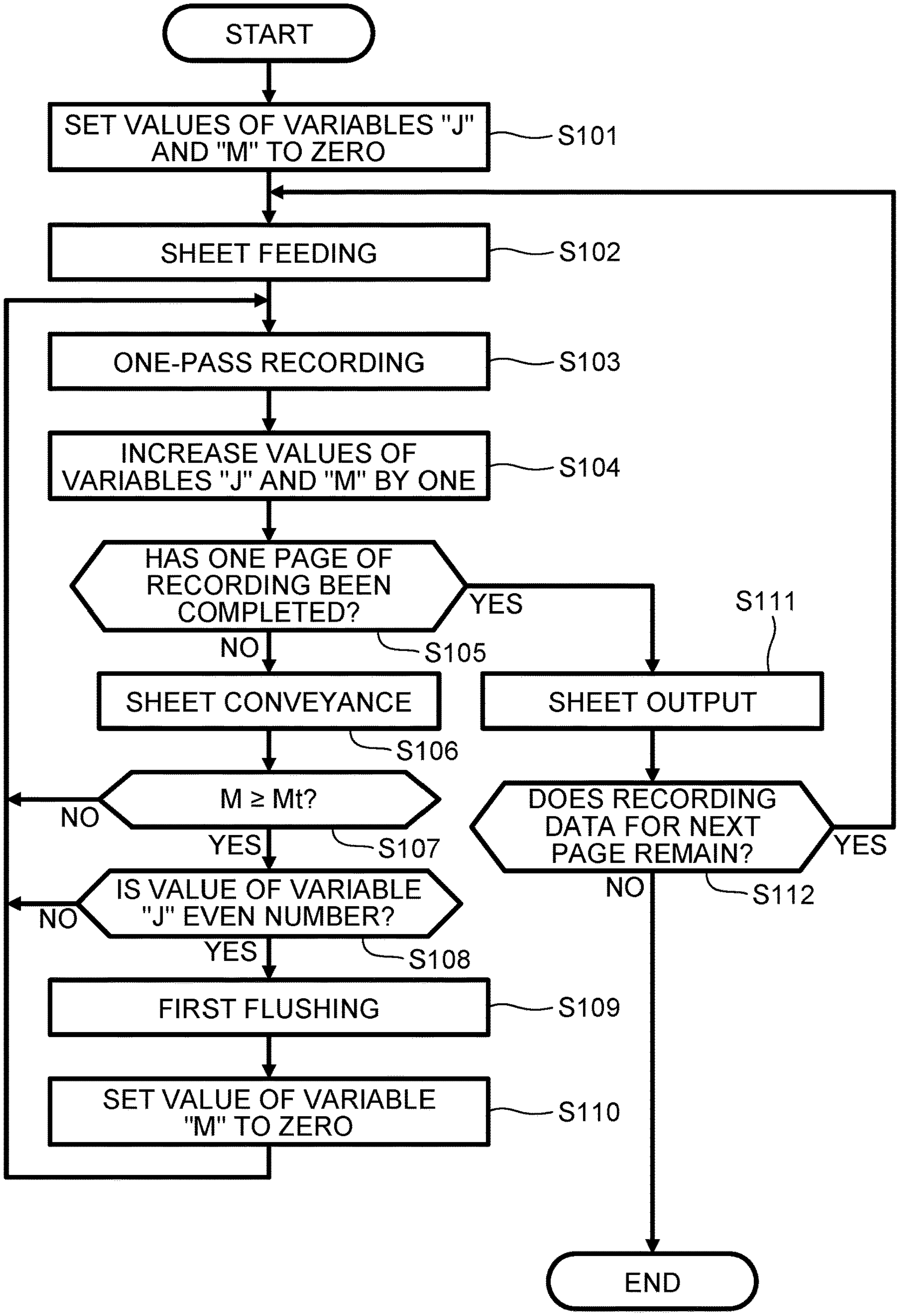
FIG. 7 is a flowchart showing steps to be executed in recording.

A description will be provided on steps to be executed by the controller 80 when the printer 1 records an image on a sheet P. In response to receiving a recording instruction to record an image on a sheet P, the controller 80 executes the steps of the flowchart in FIG. 7.

First, the controller 80 sets values of variables J and M to zero, respectively (e.g., step S101). The variable J corresponds to the number of times one-pass recording has been performed since image recording starts with respect to a current recording job. The variable M corresponds to the number of times one-pass recording has been performed after the value of the variable M sets to zero.

Subsequent to step S101, the controller 80 executes sheet feeding (e.g., step S102). In the sheet feeding, the controller 80 controls a sheet feeding mechanism to feed a sheet P and controls the conveyance motor 87 to rotate the conveyance rollers 6, 7 to convey the sheet P until the sheet P reaches a particular position where an area of the sheet P on which an image is to be recorded in a first one-pass recording faces the nozzles 10 of the inkjet head 4.

Subsequent to step S102, the controller 80 executes one-pass recording (e.g., step S103) and increases the values of the variables J and M by one, respectively (e.g., step S104). Specifically, in the one-pass recording of step S103, the controller 80 activates the carriage motor 86 to move the carriage 2 in the scanning direction, and also drives the inkjet head 4 to eject ink toward the sheet P from appropriate nozzles 10. More specifically, in response to the driver IC 89 switching the potential at a target individual electrode 64 between the ground electrode and the drive electrode, the potential difference occurring between the target individual electrode 64 and the common electrode 63 is changed. This change causes deformation in the piezoelectric layer 62 and the diaphragm 61. Thus, a corresponding pressure chamber 51 changes in its shape and thus the pressure applied to ink in the pressure chamber 51 changes, whereby ink is ejected from a nozzle 10 being in communication with the pressure chamber 51.

Subsequent to step S104, if the controller 80 determines that one page of recording on the sheet P has not been completed (e.g., NO in step S105), the controller 80 executes sheet conveyance (e.g., step S106). In the sheet conveyance, the controller 80 activates the conveyance motor 87 to rotate the conveyance rollers 6, 7 to convey the sheet P by a predetermined distance.

Subsequent to step S106, if the controller 80 determines that the value of the variable M is less than a certain value Mt (e.g., NO in step S107), the routine returns to step S103. If the controller 80 determines that the value of the variable M is equal to or greater than the certain value Mt (e.g., YES in step S107) and the value of the variable J is not an even number (e.g., NO in step S108), the routine returns to step S103. The case where the value of the variable J is not an even number may refer to a case where the carriage 2 was moved from the right to the left in the scanning direction in the last one-pass recording, and the carriage 2 is located further to the left than the platen 5 in the scanning direction after the last one-pass recording.

If the controller 80 determines that the value of the variable M is equal to or greater than the certain value Mt (e.g., YES in step S107) and the value of the variable J is an even number (e.g., YES in step S108), the controller 80 executes first flushing (e.g., step S109) and sets the value of the variable M to zero (e.g., step S110). Then, the routine returns to step S103. The case where the value of the variable J is an even number may refer to a case where the carriage 2 was moved from the left to the right in the scanning direction in the last one-pass recording, and the carriage 2 is located further to the right than the platen 5 in the scanning direction after the last one-pass recording. In this case, the carriage 2 is located at the maintenance position.

In the first flushing of step S109, specifically, the controller 80 controls the driver IC 89 to drive each individual electrode 54 in a state where the carriage 2 is positioned at the maintenance position, thereby causing the inkjet head 4 to perform first flushing in a first flushing manner. In the first flushing, the inkjet head 4 is driven to flush the nozzles 10 with ink, thereby forcefully discharging ink from each nozzle 10 toward the cap 71. In the first flushing, as illustrated in FIG. 9A, the controller 80 drives the inkjet head 4 at first time intervals ΔT1 to discharge ink forcefully from each nozzle 10 a predetermined number of times.

Subsequent to step S104, if the controller 80 determines that one page of recording on the sheet P has been completed (e.g., YES in step S105), the controller 80 executes sheet output (e.g., step S111). In the sheet output, the controller 80 activates the conveyance motor 87 to rotate the conveyance rollers 6, 7 to output the sheet P having an image thereon to the outside of the printer 1.

Subsequent to step S111, if the controller 80 determines that recording data for the next page remains (e.g., YES in step S112), the routine returns to step S102. If the controller 80 determines that recording data for the next page does not remain (e.g., NO in step S112), the routine ends.

Processing in Check Pattern Recording

A description will be provided on steps to be executed by the controller 80 in response to the controller 80 receiving an instruction signal that instructs to record a check pattern on a sheet P. The check pattern is used for determining whether, with respect to each of the nozzles 10, a target nozzle 10 is a failure nozzle. The instruction signal is an example of a second signal. In response to receiving such an instruction signal, the controller 80 executes the steps of the flowchart in FIG. 8.

More specifically, the controller 80 sets a value of a variable N to zero (e.g., step S201). The variable N indicates the number of times second flushing in a second flushing manner has been performed in step S204.

Subsequent to step S201, the controller 80 executes check-mode driving (e.g., step S202). In the check-mode driving, the controller 80 controls the driver IC 89 to drive the inkjet head 4 in the check mode for performing ejection determination to determine whether, with respect to each of nozzles 10, a target nozzle 10 is a failure nozzle. More specifically, in the ejection determination, in a state where the carriage 2 is positioned at the maintenance position, the controller 80 drives each individual electrode 64 in turn to attempt ink ejection from the respective corresponding nozzle 10. By doing so, the controller 80 determines whether ink has been ejected from the target nozzle 10. As described above, when the inkjet head 4 is driven in the check mode, the determination circuit 78 sequentially outputs a determination signal with respect to each nozzle 10, and the controller 80 receives the determination signals. The determination signal indicates that ink has been normally ejected from a target nozzle 10 or not, that is, a target nozzle 10 is a failure nozzle or not.

Subsequent to step S202, based on the determination signals received from the determination circuit 78, the controller 80 obtains the number of failure nozzles in the nozzles 10, and determines whether the nozzles 10 include one or more failure nozzles (e.g., step S203). If the controller 80 determines that the number of failure nozzles in the nozzles 10 indicates zero, that is, the nozzles 10 do not include a failure nozzle (e.g., NO in step S203), the routine proceeds to step S209.

If the controller 80 determines that the number of failure nozzles in the nozzles 10 does not indicate zero, that is, the nozzles 10 include one or more failure nozzles (e.g., YES in step S203), the controller 80 executes the second flushing (e.g., step S204) and increases the value of the variable N by one (e.g., step S205).

In the second flushing of step S204, the controller 80 controls the driver IC 89 to drive one or more individual electrodes 64 corresponding to the one or more failure nozzles in the second flushing manner. This may thus flush the one or more failure nozzles with ink, thereby discharging ink toward the cap 71 from only the one or more failure nozzles included in the nozzles 10 of the inkjet head 4.

In the second flushing, in one example illustrated in FIG. 9A, the controller 80 may drive the inkjet head 4 at second time intervals ΔT2 to discharge ink from each of the one or more failure nozzles 10 included in the nozzles 10. The second time intervals ΔT2 may be longer than the first time intervals ΔT1.

In the second flushing, in another example illustrated in FIG. 9B, the controller 80 may set the number of times ink is discharged from one or more color nozzles included in the one or more failure nozzles to a first number of times K1, and set the number of times ink is discharged from one or more black nozzles included in the one or more failure nozzles to a second number of times K2. The second number of times K2 is greater than the first number of times K1. The color nozzle may refer to a nozzle 10 from which one of the color inks such as yellow ink, magenta ink, and cyan ink is to be discharged and belongs to one of the left three nozzle rows 9. The black nozzle may refer to a nozzle 10 from which black ink is to be discharged and belongs to the rightmost nozzle row 9.

An amount of ink to be discharged and an operation time for each of the first flushing and the second flushing are both less than those in the suction purges.

Subsequent to step S205, the controller 80 executes the check-mode driving that is the same as the check-mode driving executed in step S202 (e.g., step S206). The controller 80 obtains the number of failure nozzles (e.g., a second number of failure nozzles) in the nozzles 10 obtained based on determination signals received from the determination circuit 78 when the inkjet head 4 is driven in the check mode in the check-mode driving in S206, and compares the number of failure nozzles obtained based on the result of the current ejection determination (hereinafter, simply referred to as the current number of failure nozzles) with the number of failure nozzles obtained based on the result of the previous ejection determination (hereinafter, simply referred to as the previous number of failure nozzles) (e.g., step S207). If the controller 80 determines, based on the comparison result, that the current number of failure nozzles is less than the previous number of failure nozzles, that is, the number of failure nozzles has decreased by the execution of the last second flushing (e.g., YES in step S207) and the value of the variable N has not reached a certain value Nt (e.g., NO in step S208), the routine returns to step S204.

If the controller 80 determines the previous number of failure nozzles is less than the current number of failure nozzles (e.g., YES in step S207) and the value of the variable N has reached the certain value Nt (e.g., YES in step S208), the routine proceeds to step S209. If the controller 80 determines that the current number of failure nozzles is equal to the previous number of failure nozzles (e.g., NO in step S207), the routine proceeds to S209.

The number of failure nozzles obtained based on the result of the ejection determination performed in step S206 is an example of a first number of failure nozzles. The number of failure nozzles obtained based on the result of the ejection determination performed after the second flushing in step S204 is an example of a second number of failure nozzles and an example of a third number of failure nozzles. Second flushing performed in step S204 if the controller 80 determines, based on the determination signal received from the determination circuit 78 when the inkjet head 4 is driven in the check mode, that the nozzles 10 include one or more failure nozzles is an example of a first recovery operation. Second flushing performed in step S204 if the controller 80 determines, based on the determination signal received from the determination circuit 78 when the inkjet head 4 is driven in the check mode in step S206, that the current number of failure nozzles is less than the previous number of failure nozzles is an example of a third recovery operation.

In step S209, the controller 80 executes check pattern recording. In the check pattern recording, the controller 80 executes the sheet feeding as in step S102 to feed a sheet P, and then repeats the one-pass recording as in step S103 and the sheet conveyance as in step S106. Thus, the inkjet head 4 records, on the sheet P, a check pattern to be used for determining whether, with respect to each of the nozzles 10, a target nozzle 10 is a failure nozzle, by a known procedure. The controller 80 executes the sheet output as in step S111 to output the sheet P having the check pattern to the outside of the printer 1.

Subsequent to step S209, the controller 80 displays, on the display 69, a message prompting the user to input the recording result of the check pattern (e.g., step S210). Then, the routine waits until the controller 80 receives a signal indicating the recording result of the check pattern (e.g., NO in S211). The signal indicating the recording result of the check pattern is an example of a third signal. The signal indicating the recording result of the check pattern is input to the controller 80 by an input operation performed by the user on the operation interface 70. Specifically, options showing various check patterns, respectively, are displayed on the operation interface 70. The user refers to the check pattern recorded on the sheet P and selects the option showing the recorded check pattern from the options on the operation interface 70.

If the controller 80 determines that a signal indicating the recording result of the check pattern has been received (e.g., YES in step S211), the controller 80 determines, based on the signal, whether the nozzles 10 include one or more failure nozzles (e.g., step S212). If the controller 80 determines that the nozzles 10 do not include a failure nozzle, that is, if the controller 80 determines that the input operation performed by the user on the operation interface 70 indicates the absence of a failure nozzle in the recording result of the check pattern (e.g., NO in step S212), the routine ends.

If the controller 80 determines that the nozzles 10 include one or more failure nozzles, that is, if the controller 80 determines that the input operation performed by the user on the operation interface 70 indicates the presence of one or more failure nozzles in the recording result of the check pattern (e.g., YES in step S212), the controller 80 stores failure nozzle information in the flash memory 84 based on the signal indicating the inputted recording result of the check pattern (e.g., step S213). The nozzle information may indicate locations of one or more failure nozzles, each from which ink has not been normally ejected. Subsequent to step S213, the controller 80 updates unrecoverable nozzle information based on the failure nozzle information stored up to this time (S214).

The unrecoverable nozzle information is stored in the flash memory 84. The unrecoverable nozzle information indicates which nozzle 10 is an unrecoverable nozzle. The unrecoverable nozzle refers to a nozzle whose ejection performance is determined as being less likely to be recovered even when flushing or a suction purge is performed thereon, and that is assumed to be a failure nozzle based on the determination signal. By the update of the unrecoverable nozzle information in step S214, a nozzle 10 assumed to be a failure nozzle in each of the failure nozzle information of a predetermined number consecutively stored in descending order from the last one is referred to as an unrecoverable nozzle.

Subsequent to step S214, if the controller 80 determines that the one or more nozzles 10 assumed to be failure nozzles based on the inputted recording result of the check pattern, that is, the one or more failure nozzles are all unrecoverable nozzles (e.g., YES in step S215), the routine ends.

If the controller 80 determines that the one or more nozzle 10 assumed to be failure nozzles based on the inputted recording result of the check pattern include a nozzle 10 other than the unrecoverable nozzle (hereinafter, referred to as the recoverable nozzle) (e.g., NO in step S215), the controller 80 determines a manner for a suction purge to be performed (e.g., step S216). The recoverable nozzle refers to a failure nozzle that has not been assumed to be an unrecoverable nozzle.

In step S216, when the number of nozzles 10 assumed to be failure nozzles obtained by subtracting the number of unrecoverable nozzles from the number of nozzles 10 assumed to be failure nozzles based on the inputted recording result of the check pattern is greater, a manner in which a greater amount of ink is discharged is determined as a purge manner to be adopted in a suction purge. More specifically, a reference table is generated and stored in the ROM 82. The reference table contains data including combinations each including the number obtained by subtracting the number of unrecoverable nozzles from the number of nozzles 10 assumed to be failure nozzles and a suction purge manner. In step S216, the controller 80 determines an appropriate suction purge manner by referring the reference table based on the number obtained by subtracting the number of unrecoverable nozzles from the number of nozzles 10 assumed to be failure nozzles. Subsequent to step S216, the controller 80 executes purging (e.g., step S217). In the purging, the controller 80 activates the carriage 2, the cap up-and-down mechanism 88, and the suction pump 72 to perform a suction purge in the manner determined in step S216. The suction purge to be executed in the manner determined in step S216 is an example of a second recovery operation.

In the illustrative embodiment, the inkjet head 4 that performs flushing in the first flushing manner or in the second flushing manner and the maintenance unit 8 that performs a suction purge are an example of a recovery device.

Effects

In the illustrative embodiment, in response to receiving an instruction signal that instructs to record a check pattern on a sheet P, the controller 80 of the printer 1 drives the inkjet head 4 in the check mode to perform ejection determination. As a result of the ejection determination, if the controller 80 determines that the nozzles 10 include one or more failure nozzles, the controller 80 drives the inkjet head 4 to perform flushing in the second flushing manner and then record a check pattern on a sheet P. In response to receiving a signal indicating the presence of one or more failure nozzles in the nozzles 10 in the recording result of the check pattern by an input operation performed by the user on the operation interface 70, the controller 80 activates the maintenance unit 8 to perform a suction purge.

That is, the recording of the check pattern is performed after the ejection performance of the one or more failure nozzles that is recoverable by flushing in the second flushing manner is recovered. Therefore, in a case where the ejection performance of all of the failure nozzles whose ejection performance is recoverable by flushing in the second flushing manner has been recovered, a suction purge for which an appropriate manner is determined based on the recording result of the check pattern might not need to be performed. On the other hand, in a case where the ejection performance of some of the failure nozzles whose ejection performance is recoverable by flushing in the second flushing manner has not been recovered, a suction purge manner in which an appropriate amount of ink is discharged may be determined as a suction purge manner to be adopted in a suction purge according to the number of failure nozzles whose ejection performance has not been recovered by the flushing in the second flushing manner indicated by the recording result of the check pattern. More specifically, with respect to the suction purge manner to be performed based on the recording result of the check pattern, a suction purge manner in which the amount of ink to be discharged is less as the number of failure nozzles is less. Thus, in the illustrative embodiment, the ink consumption in the recovery operation for recovering the ejection performance of the one or more failure nozzles may be saved.

In the illustrative embodiment, in the printer 1, if the controller 80 determines that the nozzles 10 include one or more failure nozzles based on a determination signal received from the determination circuit 78 when the inkjet head 4 is driven in the check mode, the controller 80 drives the inkjet head 4 to perform flushing in the second flushing manner in which the amount of ink to be discharged is less than that in a suction purge. Thus, in a case where all of the one or more failure nozzles are nozzles whose ejection performance can be recovered by flushing in the second flushing manner, the ink consumption in the recovery operation for recovering the ejection performance of the one or more failure nozzles may be saved.

In the illustrative embodiment, in the printer 1, if the controller 80 determines that the nozzles 10 include one or more failure nozzles based on a determination signal received from the determination circuit 78 when the inkjet head 4 is driven in the check mode, the controller 80 drives the inkjet head 4 to perform flushing in the second flushing manner whose operation time is less than the operation time for a suction purge. Thus, in a case where the ejection performance of the one or more failure nozzles is recoverable by flushing in the second flushing manner, the operation time for the recovery operation may be shortened.

In the illustrative embodiment, if the controller 80 determines, based on a signal indicating the recording result of the check pattern, that the nozzles 10 include one or more failure nozzles, the controller 80 activates the maintenance unit 8 to perform a suction purge. Thus, the ejection performance of the one or more recoverable nozzles may be recovered.

In many cases, thickening of ink in a nozzle 10 may be a primary cause of a failure nozzle whose ejection performance is recoverable by flushing in the second flushing manner. Therefore, in the illustrative embodiment, the controller 80 determines that the second flushing manner is to be adopted, if the controller 80 determines, based on determination signals received from the determination circuit 78 when the inkjet head 4 is driven in the check mode, that the nozzles 10 include one or more failure nozzles. In the second flushing manner, the time intervals between timings for driving the inkjet head 4 may be longer than that in the first flushing manner to be performed in image recording on a sheet P. Performing flushing in the second flushing manner may thus enable thickened ink that may cause a nozzle to be in failure is readily to be removed, thereby recovering ejection performance of a recoverable nozzle more likely.

In general, black ink is more likely to thicken than color inks (e.g., yellow ink, cyan ink, and magenta ink). Therefore, in the illustrative embodiment, in flushing in the second flushing manner, the number of times ink to be discharged from a black nozzle may be set to be greater than the number of times ink to be discharged from a color nozzle. The second flushing manner is adopted if the controller 80 determines, based on determination signals received from the determination circuit 78 when the inkjet head 4 is driven in the check mode, that the nozzles 10 include one or more failure nozzles. Accordingly, in a case where one or more recoverable nozzles are included in the black failure nozzles, such a control may enable ejection performance of the one or more recoverable nozzles may be recovered. In a case where one or more recoverable nozzles are included in the color failure nozzles, such a control may save the amount of ink to be discharged for recovering the one or more recoverable nozzles.

In the illustrative embodiment, in flushing in the second flushing manner performed in the same situation as described above, flushing is performed on only one or more failure nozzle. Thus, the ink consumption in the recovery operation for recovering the ejection performance of the one or more failure nozzles may be saved.

In the illustrative embodiment, flushing is performed in the second flushing manner if the controller 80 determines, based on determination signals received from the determination circuit 78 when the inkjet head 4 is driven in the check mode, that the nozzles 10 include one or more failure nozzles. Thereafter, the inkjet head 4 is driven again in the check mode to perform ejection determination. If the controller 80 determines that the current number of failure nozzles is less than the previous number of failure nozzles, flushing is performed in the second flushing manner again. As described above, in a case where the current number of failure nozzles has decreased by the flushing in the second flushing manner as compared with the previous number of failure nozzles, the number of failure nozzles may further decrease by performance of a further flushing in the second flushing manner. In a case where, as compared with the previous number of failure nozzles, the current number of failure nozzles has decreased after the further flushing is performed in the second flushing manner, an appropriate suction purge manner may be adopted in which a further less amount of ink to be discharged.

Further, in the illustrative embodiment, flushing in the second flushing manner and the check-mode driving of the inkjet head 4 (i.e., ejection determination) may be alternately repeated until the previous number of failure nozzles is equal to the current number of failure nozzles, that is, until the number of failure nozzles does not decrease any more. Thus, a suction purge manner in which the least amount of ink is to be discharged may be adopted in a suction purge to be performed based on the recording result of the check pattern.

Nevertheless, in a case where flushing in the second flushing manner and the check-mode driving of the inkjet head 4 are alternately repeated until the number of failure nozzles does not decrease any more, a time elapsed between reception of an instruction signal and the start of recording of a check pattern may exceed a certain time period.

Therefore, in the illustrative embodiment, if the controller 80 determines that the number of alternate repetitions of flushing in the second flushing manner and the check-mode driving of the inkjet head 4 (i.e., ejection determination) has reached the certain value Nt, the controller 80 drives the inkjet head 4 to record a check pattern on a sheet P even when the current number of failure nozzles is less than the previous number of failure nozzles. That is, the flushing in the second flushing manner and the check-mode driving of the inkjet head 4 are not repeated any more. Such a control may thus reduce the likelihood that the time elapsed between reception of an instruction signal and the start of recording of a check pattern exceeds the certain time period.

In the illustrative embodiment, in a case where one or more nozzles 10 assumed to be failure nozzles in a recording result of a check pattern are all unrecoverable nozzles, a suction purge is not performed. In other words, a suction purge is not performed in a case where the possibility that the ejection performance of the one or more failure nozzles can be recovered by the suction purge is considerably low. Such a control may thus reduce the likelihood that ink is wasted by an unnecessary suction purge.

Modifications

While the disclosure has been described in detail with reference to the specific embodiment thereof, this is merely an example, and various changes, arrangements and modifications may be applied therein without departing from the spirit and scope of the disclosure.

In the illustrative embodiment, the user performs an input operation on the operation interface 70 to input a recording result of a check pattern to the printer 1. Nevertheless, the way to input a recording result of a check pattern is not limited thereto.

Figure 10:
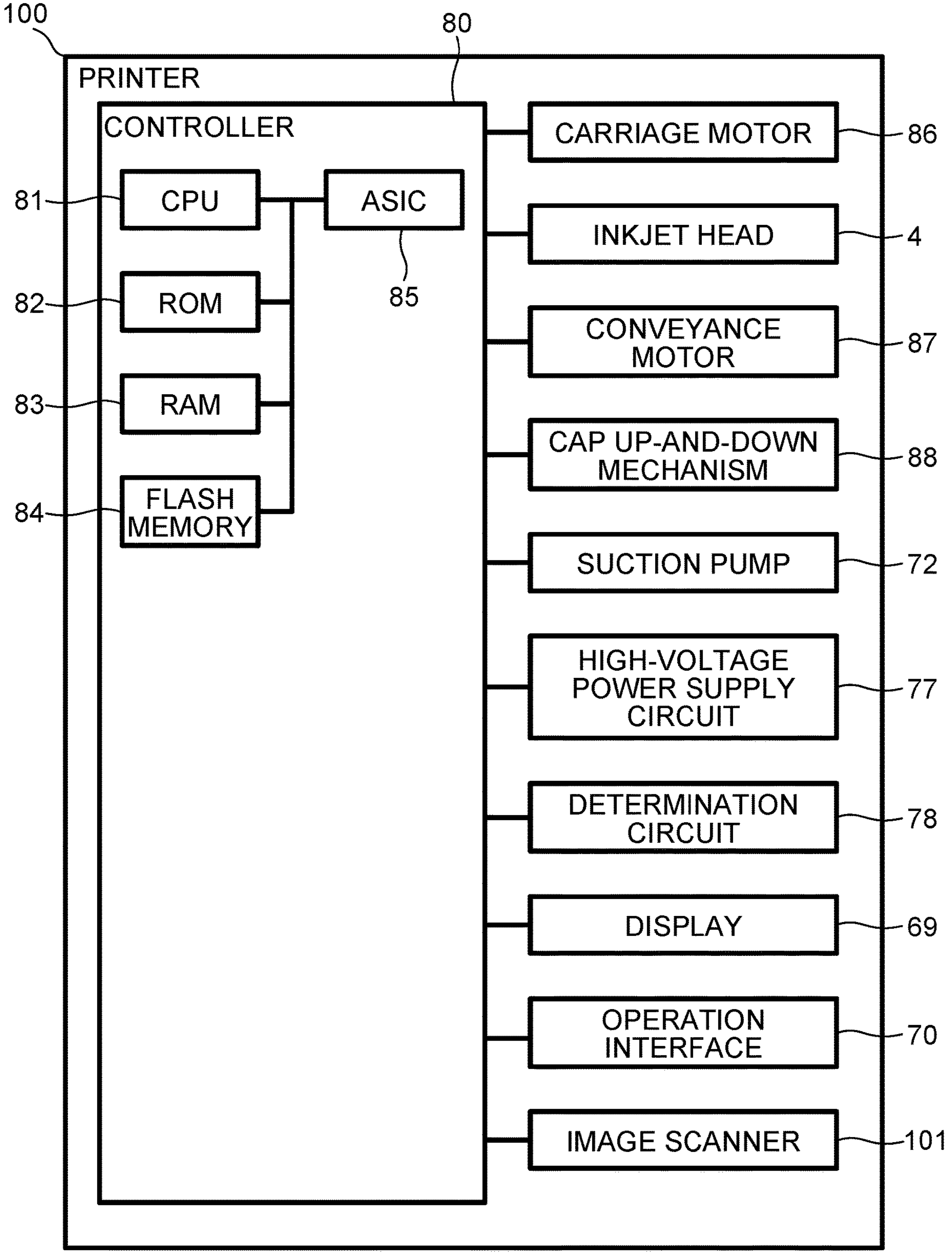
FIG. 10 is a block diagram illustrating an electrical configuration of another printer according to a first modification.
Figure 11:
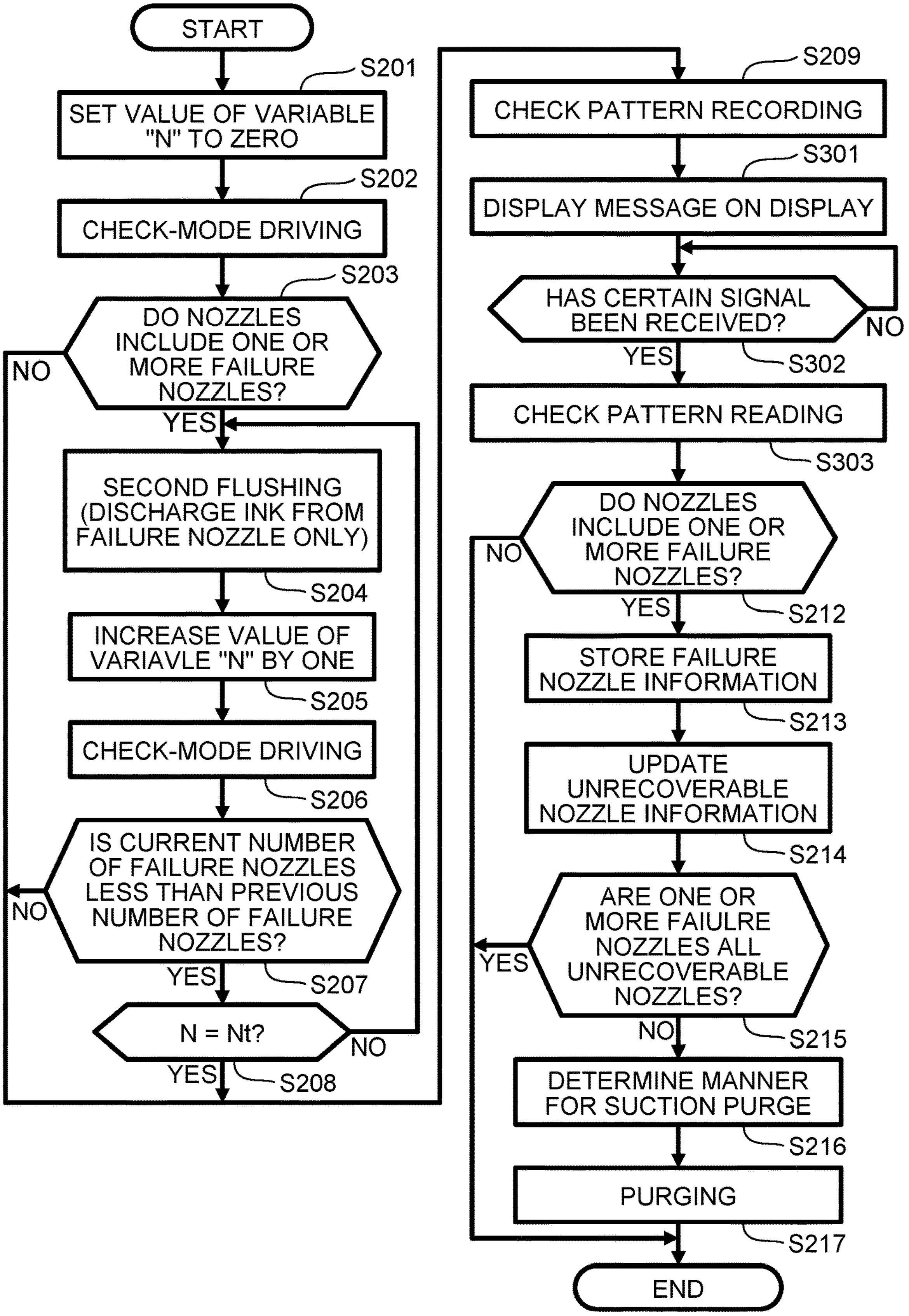
FIG. 11 is a flowchart showing steps to be executed in response to reception of an instruction to record a check pattern according to the first modification.

For example, in a first modification, as illustrated in FIG. 10, a printer 100 has a similar configuration to that of the printer 1 and further includes an image scanner 101. The image scanner 101 is another example of the inputting device. In response to receiving a signal that instructs to record a check pattern on a sheet P, the controller 80 executes the steps of the flowchart in FIG. 11.

Figure 8:
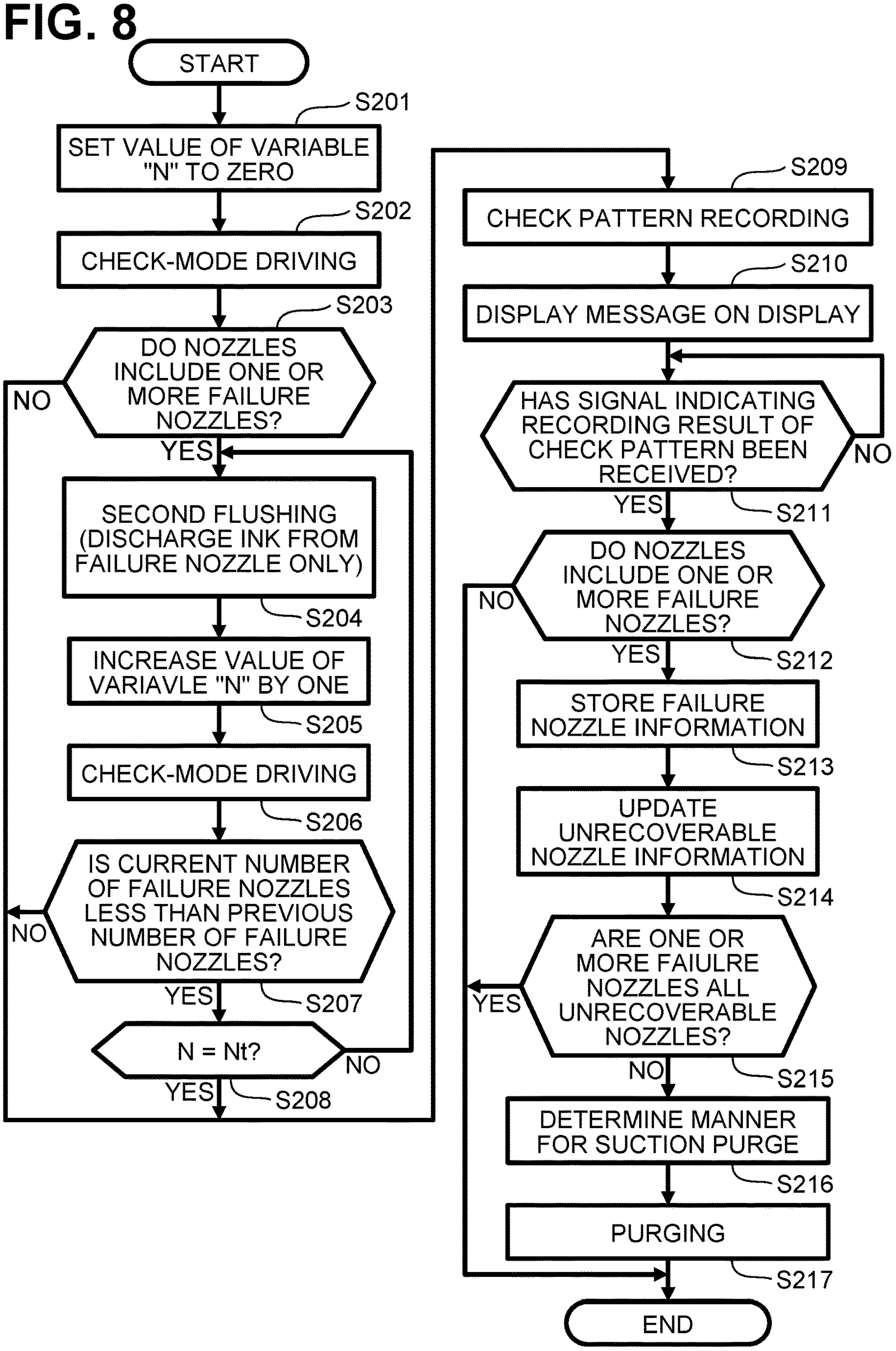
FIG. 8 is a flowchart showing steps to be executed in response to reception of an instruction to record a check pattern.

More specifically, the controller 80 executes steps S201 to S209, details of which are the same as those of steps S201 to S209 of FIG. 8 according to the illustrative embodiment. Subsequent to pattern recording in step S209, the controller 80 displays a message on the display 69 (e.g., step S301). The message prompts the user to place a sheet P having a check pattern recorded thereon at the image scanner 101 and then perform a certain operation on the operation interface 70. The routine waits until the controller 80 receives a certain signal in response to the user performing the certain operation on the operation interface 70 (e.g., NO in step S302).

In response to receiving the certain signal inputted by the user operation on the operation interface 70 (e.g., YES in step S302), the controller 80 executes check pattern reading (e.g., step S303). In the check pattern reading, the controller 80 activates the image scanner 101 to read the check pattern recorded on the sheet P. Then, the controller 80 generates read data indicating the recording result of the check pattern, and obtains information on which nozzle 10 is a failure nozzle based on the read data.

Subsequent to step S303, the controller 80 executes steps S212 to S217, details of which are the same as those of steps S212 to S217 of FIG. 8 according to the illustrative embodiment. Nevertheless, in the first modification, in step S212, the controller 80 determines, based on the read data generated in the check pattern reading in step S303, whether the nozzles 10 include one or more failure nozzles. The read data indicates, with respect to each of the nozzles 10, whether a nozzle is a failure nozzle.

In the first modification, in response to receiving an instruction signal that instructs to record a check pattern on a sheet P, the controller 80 drives the inkjet head 4 in the check mode to perform ejection determination. If the controller 80 determines that the nozzles 10 include one or more failure nozzles, the controller 80 drives the inkjet head 4 to perform flushing in the second flushing manner. Thereafter, the controller 80 drives the inkjet head 4 to record a check pattern on a sheet P. Then, the controller 80 activates the image scanner 101 to read the check pattern recorded on the sheet P, and generate read data indicating the recording result of the check pattern. If the controller 80 determines that, based on the read data, that the nozzles 10 include one or more failure nozzles, the controller 80 activates the maintenance unit 8 to perform a suction purge.

That is, the recording of the check pattern is performed after the ejection performance of the one or more failure nozzles that is recoverable by flushing in the second flushing manner is recovered. Therefore, in a case where the ejection performance of all of the one or more failure nozzles has been recovered by flushing in the second flushing manner, additional recovery operation for which an appropriate manner is determined based on the recording result of the check pattern might not need to be performed. On the other hand, in a case where the ejection performance of some of the failure nozzles whose ejection performance is recoverable by flushing in the second flushing manner has not been recovered, a suction purge manner in which an appropriate amount of ink is discharged may be adopted in a suction purge to be performed based on the read data indicating the recording result of the check patter. More specifically, with respect to the suction purge manner to be performed based on the read data indicating the recording result of the check pattern, a suction purge manner in which the amount of ink to be discharged is less as the number of failure nozzles is less. Thus, in the first modification, the ink consumption in the recovery operation for recovering the ejection performance of the one or more failure nozzles may be saved.

In the illustrative embodiment, in the second flushing in step S204, flushing is performed on only the one or more failure nozzles. Nevertheless, the details of the second flushing manner is not limited thereto. In a second modifications, in response to receiving a signal that instructs to record a check pattern on a sheet P, the controller 80 executes the steps of the flowchart in FIG. 12.

Figure 12:
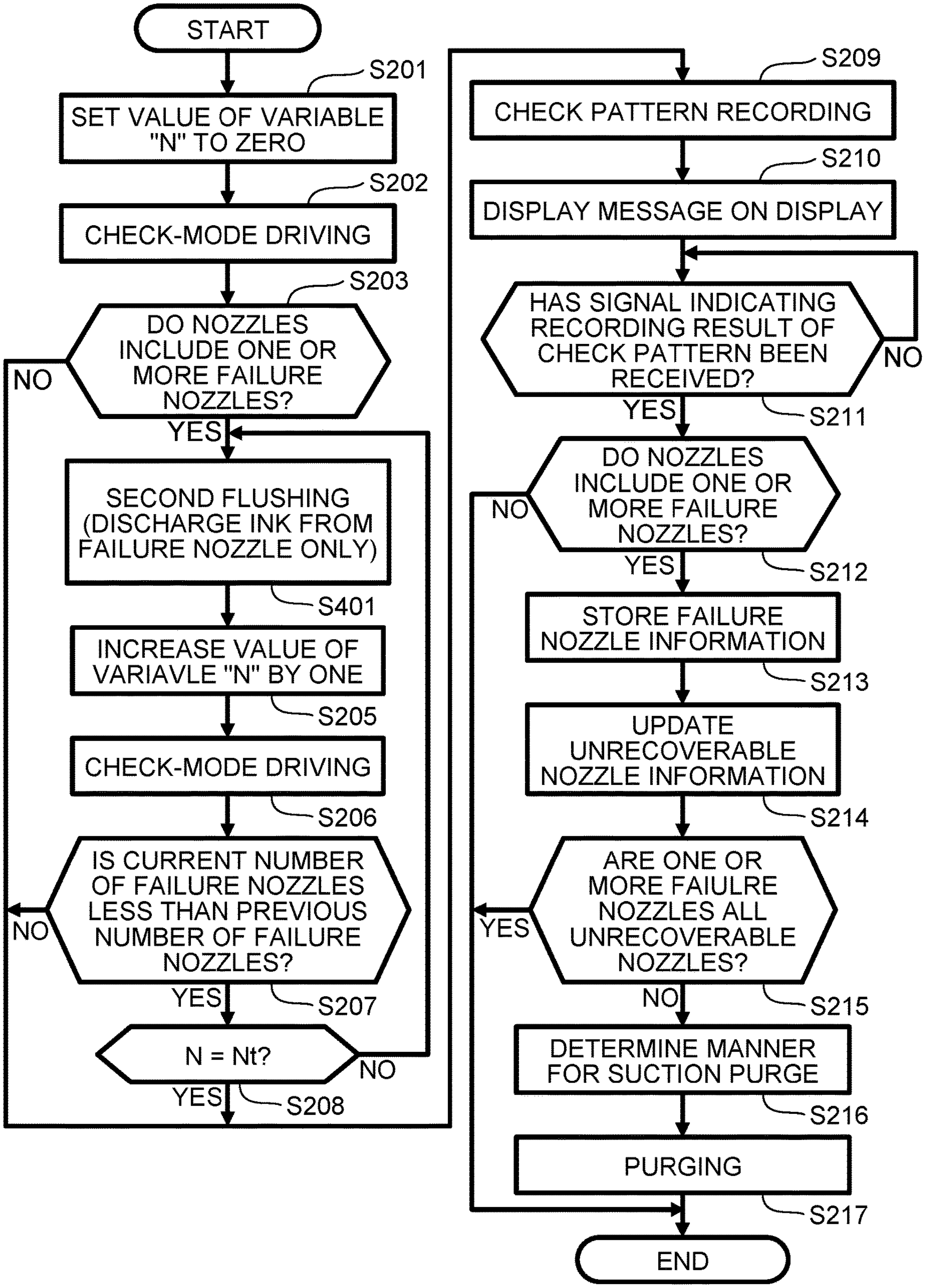
FIG. 12 is a flowchart showing steps to be executed in response to reception of an instruction to record a check pattern according to a second modification.

The flowchart of FIG. 12 includes step S401 instead of step S204 of the flowchart of FIG. 8. In step S401, the controller 80 executes the second flushing in which flushing is performed in another second flushing manner. In the second flushing of step S401, the controller 80 controls the driver IC 89 to drive each of the individual electrodes 64 corresponding to the nozzles 10. This may thus flush all the nozzles 10 with ink, thereby discharging ink toward the cap 71 from all the nozzles 10 of the inkjet head 4.

In many cases, thickening of ink in a nozzle 10 may be a primary cause of a failure nozzle whose ejection performance is recoverable by flushing in the second flushing manner. Therefore, in a case where the nozzles 10 include one or more nozzles that are in failure due to thickening of ink, ink in remaining nozzles 10 may also have already thickened to some extent. In such a situation, only the one or more failure nozzles may be flushed with ink in flushing in the second flushing manner that is performed when the controller 80 determines, based on determination signals received from the determination circuit 78 when the inkjet head 4 is driven in the check mode, that the nozzles 10 include one or more failure nozzles. However, one or more nozzles 10 that have not been assumed to be failure nozzles may become failure nozzles immediately afterwards.

Thus, in the second modification, in flushing in the second flushing manner performed in the same situation as described above, all the nozzles 10 of the inkjet head 4 are flushed with ink. Thus, the thickened ink may be all removed from the nozzles 10, thereby enabling the inkjet head 4 to eject ink normally from all the nozzles 10.

Like ink in the one or more failure nozzles, ink in one or more nozzles located in the vicinity of the one or more failure nozzles may also have already thickened. Thus, in another example, not only the one or more failure nozzles but also their neighboring nozzles may be flushed with ink in flushing in the second flushing manner, thereby discharging ink therefrom.

In the illustrative embodiment, the second time intervals ΔT2 between timings for driving the inkjet head 4 in flushing in the second flushing manner may be longer than the first time intervals ΔT1 between timings for driving the inkjet head 4 in flushing in the first flushing manner.

Nevertheless, in a third modification, as illustrated in FIG. 13, in flushing in the first flushing manner, the drive potential applied to each individual electrode 64 is a first potential V1. In flushing in the second flushing manner, the drive potential applied to each individual electrode 64 is a second potential V2 higher than the first potential V1.

In many cases, thickening of ink in a nozzle 10 may be a primary cause of a failure nozzle whose ejection performance is recoverable by flushing. Thus, in the third modification, a particular drive potential is applied to each individual electrode 64 in flushing in the second flushing manner to be performed if the controller 80 determines, based on determination signals received from the determination circuit 78 when the inkjet head 4 is driven in the check mode, that the nozzles 10 include one or more failure nozzles. The particular drive potential is higher than the drive potential applied in flushing in the first flushing manner to be performed in image recording on a sheet P. Performing flushing in such a second flushing manner may thus enable thickened ink that may cause a nozzle to be in failure is readily to be removed, thereby recovering ejection performance of a recoverable nozzle more likely.

In other modifications, as with the illustrative embodiment, the second time intervals ΔT2 between timings for driving the inkjet head 4 in flushing in the second flushing manner may be longer than the first time intervals ΔT1 between timings for driving the inkjet head 4 in flushing in the first flushing manner. In addition, as with the third modification, the drive potential (e.g., the second potential V2) applied to each individual electrode 64 in flushing in the second flushing manner may be higher than the drive potential (e.g., the first potential V1) applied to each individual electrode 64 in flushing the first flushing manner.

Respective different conditions other than the time intervals between timings for driving the inkjet head 4 and the drive potential applied to each individual electrode 64 may be adopted in flushing in the first flushing manner and flushing in the second flushing manner. Under different conditions, the individual electrodes 64 may activate in different driving manners. The conditions may refer to the length or duration of a pulse for applying a certain potential to an individual electrode 64, the number of times the pulses to be applied, or combinations of multiple pulses for applying a potential to the individual electrode 64. Alternatively, the same conditions may be adopted in both flushing in the first flushing manner and flushing in the second flushing manner so that the individual electrodes 64 may activate in the same driving manner.

In the illustrative embodiment, a suction purge is not performed in a case where the printer 1 stores the unrecoverable nozzle information in the flash memory 84 and one or more nozzles 10 assumed to be failure nozzles based on a recording result of a check pattern are all unrecoverable nozzles. Nevertheless, in other embodiments, unrecoverable nozzle information might not be stored in a printer. In this case, the controller 80 may activate the maintenance unit 8 to perform a suction purge every time the controller 80 determines, based on the recording result of the check pattern, that the nozzles 10 include one or more failure nozzles.

In the illustrative embodiment, if the controller 80 determines, based on determination signals received from the determination circuit 78 when the inkjet head 4 is driven in the check mode, that the nozzles 10 include one or more failure nozzles, the controller 80 drives the inkjet head 4 to perform flushing in the second flushing manner. Thereafter, the controller 80 again drives the inkjet head 4 in the check mode to perform ejection determination, and obtains the current number of failure nozzles based on the ejection determination. If the controller 80 determines that the current number of failure nozzles is less than the previous number of failure nozzles, flushing in the second flushing manner and the check-mode driving of the inkjet head 4 (i.e., ejection determination) are alternately repeated until the controller 80 determines that the current number of failure nozzles is equal to the previous number of failure nozzles, that is, until the number of failure nozzles does not decrease any more. Nevertheless, if the controller 80 determines that the number of alternate repetitions of flushing in the second flushing manner and the check-mode driving of the inkjet head 4 has reached the certain value Nt, the controller 80 drives the inkjet head 4 to record a check pattern on a sheet P even when the controller 80 determines that the current number of failure nozzles is less than the previous number of failure nozzles.

Nevertheless, in other embodiments, regardless of the number of alternate repetitions of flushing in the second flushing manner and the check-mode driving of the inkjet head 4, flushing in the second flushing manner and the check-mode driving of the inkjet head 4 may be alternately repeated until the controller 80 determines that the current number of failure nozzles is equal to the previous number of failure nozzles as a result of the comparison based on the determination signal received from the determination circuit 78.

Alternatively, subsequent to flushing in the second flushing manner in step S204, the inkjet head 4 may be driven in the check mode one more time to perform ejection determination. If the controller 80 determines, based on determination signals received from the determination circuit 78 when the inkjet head 4 is driven in the check mode, that the current number of failure nozzles is less than the previous number of failure nozzles, the controller 80 may drive the inkjet head 4 to perform flushing in the second flushing manner once again. Thereafter, the controller 80 may drive the inkjet head 4 to record a check pattern without executing further check-mode driving (i.e., ejection determination) before the check pattern recording.

In the illustrative embodiment, the same second flushing manner is adopted in the recovery operation to be performed if the controller 80 determines, based on a result of ejection determination in step S202, that the nozzles 10 include one or more failure nozzles, and in the recovery operation to be performed if the controller 80 determines, based on a result of ejection determination in step S206, that the current number of failure nozzles is less than the previous number of failure nozzles. Nevertheless, in other embodiments, another manner may be adopted in the recovery operation to be performed if the controller 80 determines, based on a result of ejection determination in step S206, that the current number of failure nozzles is less than the previous number of failure nozzles. For example, a flushing manner in which a target nozzle 10 is flushed with ink more frequently than in the second flushing manner, or a flushing manner in which a potential applied to a target individual electrode 64 is higher than that in the second flushing manner may be adopted in the recovery operation.

If the controller 80 determines, based on determination signals received from the determination circuit 78, that the nozzles 10 include one or more failure nozzles, the controller 80 may drive the inkjet head 4 to perform flushing in the second flushing manner. Thereafter, the controller 80 may drive the inkjet head 4 to record a check pattern on a sheet P without driving the inkjet head 4 in the check mode to perform ejection determination again.

In the illustrative embodiment, in flushing in the second flushing manner, the second number of times K2 that indicates the frequency of ink discharge from a black nozzle is greater than the first number of times K1 that indicates the frequency of ink discharge from a color nozzles. In a case where there is no great difference in the viscosity increase between the black ink and the color inks, the number of times ink to be discharged from a black nozzle may be equal to the number of times ink to be discharged from a color nozzle in flushing in the second flushing manner.

In the illustrative embodiment, if the controller 80 determines, based on determination signals received from the determination circuit 78 in the check-mode driving in step S202, that the nozzles 10 include one or more failure nozzles, the controller 80 drives the inkjet head 4 to perform flushing in the second flushing manner. Nevertheless, in other embodiments, if the controller 80 determines, based on determination signals received from the determination circuit 78 in the check-mode driving in step S202, that the nozzles 10 include one or more failure nozzles, the controller 80 may activate the maintenance unit 8 to perform a suction purge in the suction purge manner in which the amount of ink to be discharged is less than that in the suction purge manner adopted for in the purging in step S217.

In the illustrative embodiment, if the controller 80 determines, based on the recording result of the check pattern, that the nozzles 10 include one or more failure nozzles, the controller 80 activates the maintenance unit 8 to perform a suction purge. Nevertheless, in other embodiments, if the controller 80 determines, based on the recording result of the check pattern, that the nozzles 10 include one or more failure nozzles, the controller 80 may adopt, as a manner for the recovery operation to be performed a flushing manner in which the nozzles 10 are flushed with ink more frequently than in the second flushing manner, or a flushing manner in which the drive potential applied to the individual electrodes 64 is higher than that in the second flushing manner.

In the first recovery manner adopted if the controller 80 determines, based on determination signals received from the determination circuit 78, that the nozzles 10 include one or more failure nozzles, the amount of ink to be discharged and the operation time for the recovery operation are both greater than those in the second recovery manner adopted if the controller 80 determines, based on a recording result of a check pattern, that the nozzles 10 include one or more failure nozzles. Nevertheless, in other embodiments, in the second recovery manner, the operation time may be shorter than or equal to that in the first recovery manner if the amount of ink to be discharged is greater than that in the first recovery manner. Alternatively, if there is no great difference in the viscosity increase between the color inks and the black ink, in the second recovery manner, the amount of ink to be discharged may be equal to that in the first recovery manner if the operation time for the second recovery manner is shorter than that for the first recovery manner. Alternatively, both the amount of ink to be discharged and the operation time in the second recovery manner may be equal to those in the first second recovery manner.

In the illustrative embodiment, when the inkjet head 4 is driven in the check mode, ink is ejected from each of the nozzles 10. Nevertheless, in other embodiments, when the inkjet head 4 is driven in the check mode, ink may be ejected from only some of the nozzles 10 of the inkjet head 4, such as alternate nozzles 10 in each nozzle row 9. In this case, the controller 80 may determine whether, with respect to each of the nozzles 10 from which ink is not ejected, a target nozzle is a failure nozzle based on a determination signal received from the determination circuit 78 when the inkjet head 4 is driven in the check mode.

In the illustrative embodiment, in response to the inkjet head 4 being driven for ejecting ink toward the detection electrode 76 from a target nozzle 10, the determination circuit 78 outputs a determination signal responsive to changes in potential at the detection electrode 76. That is, based on determination whether ink has contacted the detection electrode 76 when the inkjet head 4 is driven in the check mode, the determination circuit 78 outputs a determination signal indicating whether a target nozzle 10 is a failure nozzle.

Nevertheless, the determination circuit 78 may output such a determination signal based on determination whether ink has contacted the detection electrode 76 when the inkjet head 4 is driven in the check mode. In this case, a pair of detection electrodes may be disposed extending in the vertical direction. The inkjet head 4 may be driven for ejecting ink from a target nozzle 10. In a case where ink is ejected from the target nozzle 10, the ink passes through between the detection electrodes facing each other. A determination circuit may output a determination signal indicating whether a target nozzle 10 is a failure nozzle, responsive to changes in potential at the detection electrodes when the inkjet head 4 is driven for ejecting ink from the target nozzle 10.

Alternatively, the printer 1 may include an optical sensor that may detect ink ejected from a target nozzle 10 of the inkjet head 4 and output a determination signal indicating whether the target nozzle 10 is a failure nozzle. The optical sensor is another example of the signal output device.

Alternatively, a known technique for outputting a determination signal may be adopted. For example, a printer may include a voltage detection circuit connected to a nozzle plate of an inkjet head. In response to the inkjet head being driven for ejecting ink from a target nozzle, the voltage detection circuit may detect changes in voltage at the voltage detection circuit and output, to a controller, a determination signal indicating whether a target nozzle is a failure nozzle. The voltage detection circuit is another example of the signal output device.

Alternatively, another known technique for outputting a determination signal may be adopted. For example, a substrate of an inkjet head may include a temperature detection element. The temperature detection element is another example of the signal output device. In such a case, a first voltage may be applied to a heater to cause the inkjet head to eject ink from a target nozzle. Then, a second voltage may be applied to the heater not to allow the inkjet head to eject ink from the target nozzle. The temperature detection element may output a determination signal indicating whether a target nozzle is a failure nozzle, based on changes in temperature detected by the temperature detection element until a certain time period elapses from the application of the second voltage.

In the examples described above, the controller 80 determines that a nozzle 10 that is in failure in ink ejection is assumed to be a failure nozzle. For example, the printer 1, 100 may further include a signal output device that may output a signal indicating whether ink has been ejected from a target nozzle 10 in a proper direction. The controller 80 may determine, based on the signal received from the signal output device, that the nozzle 10 from which ink has not been ejected in the proper direction is a failure nozzle.

In the examples, a suction purge is performed in purging. Nevertheless, in other embodiments, the printer 1, 100 may include a pressurization pump. The pressurization pump may be located at a middle of the tube 15 that connects between the subtank 3 and the ink cartridges 14. Alternatively, the printer 1, 100 may include a pressurization pump connected to the ink cartridges 14. In these cases, in a state where the nozzles 10 are covered by the cap 71, a pressurization purge may be performed in which the pressurization pump is activated to apply pressure to ink in the nozzles 10 of the inkjet head 4 to flush the nozzles 10 with ink. The pressurization purge is another example of the second recovery operation.

In purging, both a suction purge using the suction pump 72 and a pressurization purge using the pressurization pump may be performed.

The disclosure has been applied to a printer including a serial head that ejects ink from appropriate nozzles while the serial head moves in the scanning direction together with a carriage. Nevertheless, the disclosure may be applied to a printer including a line head extending over the entire length of a sheet P in the scanning direction.

The disclosure has been applied to a printer that ejects ink from nozzles of an inkjet head to record an image on a sheet P. Nevertheless, the disclosure may also be applied to another printer that may record an image on a recording medium other than a sheet. Examples of the recording media include a T-shirt, a sheet for outdoor advertisement, a casing of a mobile terminal such as a smartphone, a cardboard, and a resin member. Further, the disclosure may also be applied to a liquid ejection apparatus that may eject liquid other than ink such as liquid resin or liquid metal.

What is claimed is:

1. A liquid ejection apparatus comprising:
- a liquid ejection head having nozzles, the liquid ejection head configured to be driven in a check mode;
- a signal output device configured to, when the liquid ejection head is driven in the check mode, output a first signal indicating that a first nozzle is in failure in liquid ejection, the first nozzle being one of the nozzles;
- a recovery device configured to selectively perform a first recovery operation and a second recovery operation, which is different from the first recovery operation, to discharge liquid from the nozzles; and
- a controller configured to in response to receiving a second signal, activate the signal output device, and drive the liquid ejection head in the check mode for ejecting liquid from the nozzles, the second signal instructing to record a check pattern on a recording medium, in response to receiving the first signal, activate the recovery device to perform the first recovery operation, and subsequent to the first recovery operation, drive the liquid ejection head to record the check pattern on the recording medium.

2. The liquid ejection apparatus according to claim 1, further comprising an inputting device, wherein the controller is further configured to subsequent to the recording of the check pattern on the recording medium, receive a third signal from the inputting device, determine, based on the third signal, whether the first nozzle is in failure, and in response to determination that the first nozzle is in failure, activate the recovery device to perform the second recovery operation.

3. The liquid ejection apparatus according to claim 2, wherein the inputting device is an image scanner, and wherein the controller is further configured to subsequent to the recording of the check pattern on the recording medium, activate the image scanner to read the check pattern recorded on the recording medium, wherein the image scanner is configured to generate read data representing the recorded check pattern, receive the read data from the image scanned, determine, based on the read data, whether the first nozzle is in failure, and in response to determination that the first nozzle is in failure, activate the recovery device to perform the second recovery operation.

4. The liquid ejection apparatus according to claim 2, wherein an amount of liquid discharged in the first recovery operation is less than an amount of liquid discharged in the second recovery operation.

5. The liquid ejection apparatus according to claim 2, wherein an operation time for the first recovery operation is less than an operation time for the second recovery operation.

6. The liquid ejection apparatus according to claim 2, wherein the recovery device includes a pump communicable to the liquid ejection head, and wherein the controller is further configured to operate the pump in the second recovery operation.

7. The liquid ejection apparatus according to claim 1, wherein the controller is further configured to activate the recovery device to perform a flushing operation to drive the liquid ejection head to flush the first nozzle with liquid, thereby discharging liquid from the first nozzle, and wherein the first recovery operation is the flushing operation.

8. The liquid ejection apparatus according to claim 7, wherein the controller is further configured to activate the recovery device to perform the flushing operation in a first flushing manner to drive the liquid ejection head at first time intervals to discharge liquid from the first nozzle, wherein the controller is further configured to activate the recovery device to perform the flushing operation in a second flushing manner to drive the liquid ejection head at second time intervals greater than the first time intervals to discharge liquid from the first nozzle, and wherein the first recovery operation is the flushing operation in the second flushing manner.

9. The liquid ejection apparatus according to claim 7, wherein the liquid ejection head further includes:

a pressure chamber in communication with the first nozzle; and a drive element configured to apply pressure to liquid in the pressure chamber, wherein the liquid ejection apparatus further comprises a driver IC configured to apply a potential to the drive element, wherein the controller is further configured to activate the recovery device to perform the flushing operation in a first flushing manner to control the drive IC to apply a first potential to the drive element, and activate the recovery device to perform the flushing operation in a second flushing manner to control the drive IC to apply a second potential to the drive element, the second potential being greater than the first potential, and wherein the first recovery operation is the flushing operation in the second flushing manner.

10. The liquid ejection apparatus according to claim 7, wherein the nozzles include:

a second nozzle from which liquid is to be ejected; and a third nozzle from which liquid is to be ejected, liquid to be ejected from the third nozzle being more likely to thicken than liquid to be ejected from the second nozzle, and wherein the controller is further configured to activate the recovery device to perform the flushing operation to drive the liquid ejection head such that a number of times liquid is discharged from the third nozzle is greater than a number of times liquid is discharged from the second nozzle.

11. The liquid ejection apparatus according to claim 1, wherein the controller is further configured to activate the recovery device to perform the first recovery operation to drive the liquid ejection head to discharge liquid from each of the nozzles.

12. The liquid ejection apparatus according to claim 11, wherein the controller is further configured to activate the recovery device to perform a flushing operation to drive the liquid ejection head to flush each of the nozzles with liquid, thereby discharging liquid from each of the nozzles, and wherein the first recovery operation is the flushing operation.

13. The liquid ejection apparatus according claim 1, wherein the controller is further configured to:

subsequent to the first recovery operation, determine a first number of failure nozzles, activate the signal output device, and drive the liquid ejection head in the check mode;

in response to receiving the first signal, determine a second number of failure nozzles and determine whether the second number is less than the first number; and in response to determination that the second number is less than the first number, drive the recovery device to perform a third recovery operation.

14. The liquid ejection apparatus according to claim 13, wherein the controller is further configured to, subsequent to the third recovery operation, drive the liquid ejection head to record the check pattern on the recording medium.

15. The liquid ejection apparatus according to claim 13, wherein the controller is further configured to:

subsequent to the third recovery operation, activate the signal output device, and drive the liquid ejection head in the check mode;

in response to receiving the first signal, determine a third number of failure nozzles and determine whether the third number is less than or equal to the second number; and in response to determination that the third number is less than the second number, drive the recovery device to perform the third recovery operation and subsequently drive the liquid ejection head in the check mode, thereby performing for a particular number of times a cycle of the third recovery operation and the driving of the liquid ejection head in the check mode.

16. The liquid ejection apparatus according to claim 15, wherein the controller is further configured to, in response to determination that, while performing the cycle for the particular number of times, the third number is equal to the second number, drive the liquid ejection head to record the check pattern on the recording medium.

17. The liquid ejection apparatus according to claim 15, wherein the controller is further configured to, in response to determination that, after performing the cycle for the particular number of times, the third number is less than the second number, drive the liquid ejection head to record the check pattern on the recording medium.

18. The liquid ejection apparatus according to claim 1, further comprising a storage configured to store data relating to an unrecoverable nozzle, and wherein the controller is further configured to subsequent to the recording of the check pattern on the recording medium, receive a third signal from an inputting device, determine, based on the third signal, whether the first nozzle is in failure, in response to determination that the first nozzle is in failure, determine, based on the data stored in the storage, whether the first nozzle is unrecoverable nozzle, and in response to determination that the first nozzle is unrecoverable nozzle, not allow the liquid ejection head to activate the recovery device for the first nozzle.

19. A liquid ejection apparatus comprising:

a liquid ejection head having nozzles, the liquid ejection head configured to be driven in a check mode;

a signal output device configured to, when the liquid ejection head is driven in the check mode, output a first signal indicating that a first nozzle is in failure in liquid ejection, the first nozzle being one of the nozzles;

a recovery device configured to perform a first recovery operation or a second recovery operation to discharge liquid from the nozzles; and a controller configured to in response to receiving a second signal, activate the signal output device, and drive the liquid ejection head in the check mode for ejecting liquid from the nozzles, the second signal instructing to record a check pattern on a recording medium, in response to receiving the first signal, activate the recovery device to perform the first recovery operation, and subsequent to the first recovery operation, drive the liquid ejection head to record the check pattern on the recording medium, wherein the liquid ejection apparatus further comprises an inputting device, wherein the controller is further configured to subsequent to the recording of the check pattern on the recording medium, receive a third signal from the inputting device, determine, based on the third signal, whether the first nozzle is in failure, and in response to determination that the first nozzle is in failure, activate the recovery device to perform the second recovery operation, and wherein an amount of liquid discharged in the first recovery operation is less than an amount of liquid discharged in the second recovery operation.

20. A liquid ejection apparatus comprising:

a liquid ejection head having nozzles, the liquid ejection head configured to be driven in a check mode;

a signal output device configured to, when the liquid ejection head is driven in the check mode, output a first signal indicating that a first nozzle is in failure in liquid ejection, the first nozzle being one of the nozzles;

a recovery device configured to perform a first recovery operation or a second recovery operation to discharge liquid from the nozzles; and a controller configured to in response to receiving a second signal, activate the signal output device, and drive the liquid ejection head in the check mode for ejecting liquid from the nozzles, the second signal instructing to record a check pattern on a recording medium, in response to receiving the first signal, activate the recovery device to perform the first recovery operation, and subsequent to the first recovery operation, drive the liquid ejection head to record the check pattern on the recording medium, wherein the liquid ejection apparatus further comprises an inputting device, wherein the controller is further configured to subsequent to the recording of the check pattern on the recording medium, receive a third signal from the inputting device, determine, based on the third signal, whether the first nozzle is in failure, and in response to determination that the first nozzle is in failure, activate the recovery device to perform the second recovery operation, and wherein an operation time for the first recovery operation is less than an operation time for the second recovery operation.

* * * * *